(12) United States Patent
Ingale et al.

(10) Patent No.: US 10,638,392 B2
(45) Date of Patent: *Apr. 28, 2020

(54) METHOD AND APPARATUS FOR OFFLOAD OPERATION OF THE IDLE MODE IN A CELLULAR DEVICE

(71) Applicant: Samsung Electronics Co., Ltd., Suwon-si, Gyeonggi-do (KR)

(72) Inventors: Mangesh Abhimanyu Ingale, Yongin-si (KR); Anil Agiwal, Suwon-si (KR); Diwakar Sharma, Bangalore (IN); Prasad Rajaram Rao, Bangalore (IN); Vrind Tushar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,151

(22) Filed: Mar. 26, 2018

(65) Prior Publication Data

US 2018/0220350 A1 Aug. 2, 2018

Related U.S. Application Data

(63) Continuation of application No. 15/243,930, filed on Aug. 22, 2016, now Pat. No. 9,930,598.

(30) Foreign Application Priority Data

Aug. 21, 2015 (IN) .............................. 902/KOL/2015

(51) Int. Cl.
*H04W 36/22* (2009.01)
*H04W 4/80* (2018.01)
(Continued)

(52) U.S. Cl.
CPC ............. *H04W 36/22* (2013.01); *H04W 4/80* (2018.02); *H04W 28/08* (2013.01); *H04W 48/18* (2013.01);
(Continued)

(58) Field of Classification Search
None
See application file for complete search history.

(56) References Cited

U.S. PATENT DOCUMENTS 9,930,598 B2 * 3/2018 Ingale .................. H04W 36/22
2010/0203905 A1 8/2010 Chaubey et al.
(Continued)

OTHER PUBLICATIONS

Supplementary European Search Report dated May 22, 2018 in connection with European Patent Application No. 16 83 9553.
(Continued)

*Primary Examiner* — Diane L Lo

(57) ABSTRACT

A dormant/idle mode operation of a plurality of cellular device(s) is offloaded using proximity radio interface to a second device having cellular capability so that a plurality of cellular devices can turn off the radio and baseband circuitry associated with the cellular capability, and save battery power. The second device to which the dormant/idle mode operation is offloaded acts like a proxy device for a plurality of cellular devices to perform at least one of the following functions on behalf of plurality of cellular devices: monitor network page, perform cell re-selection, perform tracking area update, or perform D2D transmission and reception, wherein the second device and the plurality of cellular devices are connected each other through a proximity radio interface.

16 Claims, 19 Drawing Sheets

(51) Int. Cl.
*H04W 48/18* (2009.01)
*H04W 28/08* (2009.01)
*H04W 76/14* (2018.01)
*H04W 76/27* (2018.01)
*H04W 88/04* (2009.01)
*H04W 76/10* (2018.01)
*H04W 48/20* (2009.01)

(52) U.S. Cl.
CPC ........... *H04W 76/10* (2018.02); *H04W 76/14* (2018.02); *H04W 76/27* (2018.02); *H04W 88/04* (2013.01); *H04W 48/20* (2013.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/21* (2018.01); *Y02D 70/26* (2018.01)

(56) References Cited

U.S. PATENT DOCUMENTS

| | | |
|---|---|---|
| 2014/0204909 A1 | 7/2014 | Cheng et al. |
| 2014/0362689 A1 | 12/2014 | Koc et al. |
| 2015/0181491 A1 | 6/2015 | Van Phan et al. |
| 2016/0374104 A1* | 12/2016 | Watfa ................ H04W 36/0011 |

OTHER PUBLICATIONS

European Patent Office, "Communication pursuant to Article 94(3) EPC," Application No. EP16839553.1, dated Oct. 23, 2019, 6 pages.

* cited by examiner

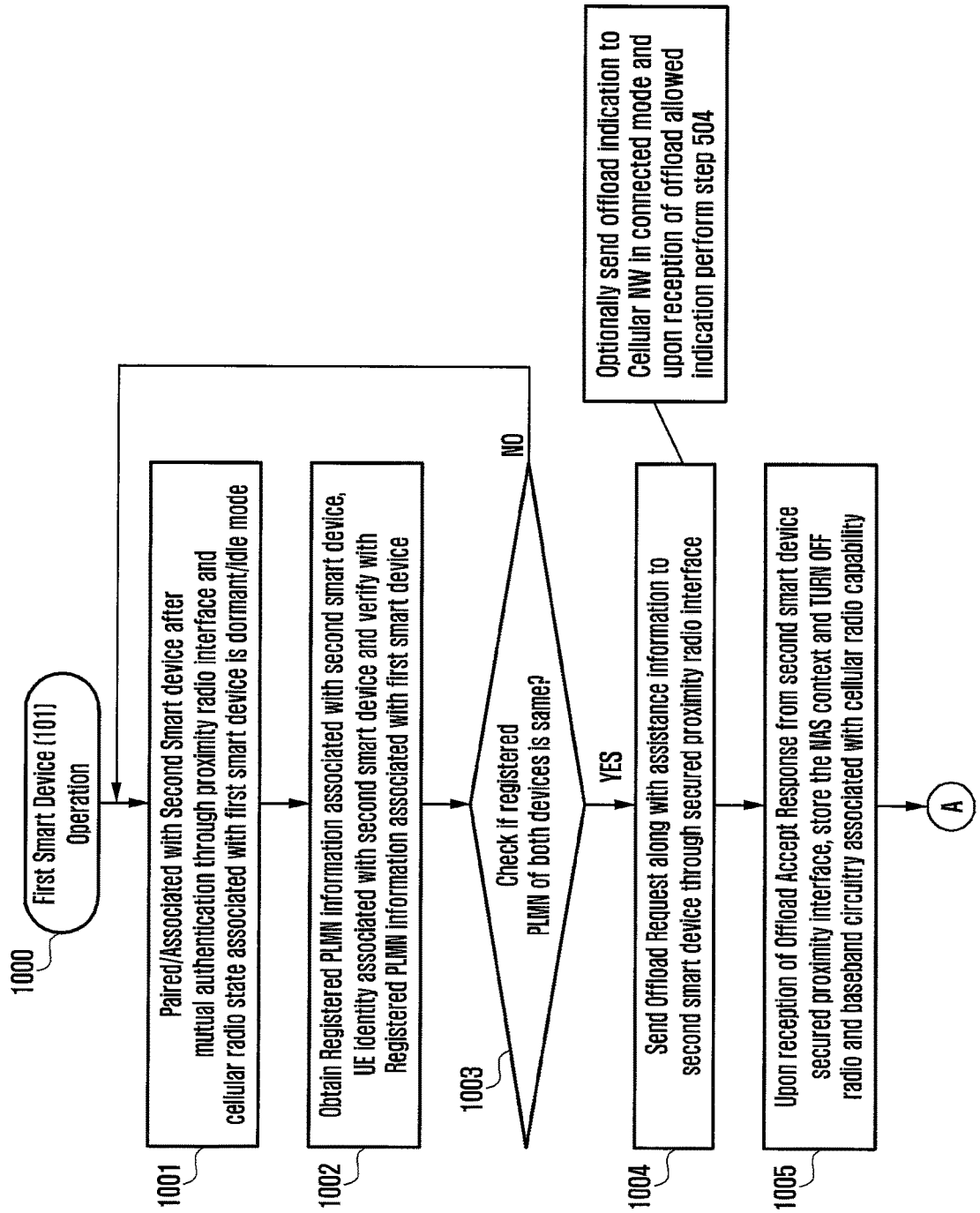

METHOD AND APPARATUS FOR OFFLOAD OPERATION OF THE IDLE MODE IN A CELLULAR DEVICE

CROSS-REFERENCE TO RELATED APPLICATIONS AND CLAIM OF PRIORITY

This application is a continuation of application Ser. No. 15/243,930, which claims priority to Indian Provisional application No. 902/KOL/2015, filed on Aug. 21, 2015, in the Indian Patent Office, the entire disclosures of which are hereby incorporated by reference.

TECHNICAL FIELD

The present disclosure broadly relates to the field of cellular communication and more specifically related to offload of dormant/idle mode operation from a first cellular device to a second cellular device so that the second cellular device acts as a proxy for the first cellular device.

BACKGROUND

There is huge growth in a number of smart devices such as smartphones, tablets, smartwatches, wearables etc. in different parts of the world. These smart devices have at least one radio capability such as Bluetooth/WiFi, or cellular capability like the third generation (3G) based on universal mobile telecommunication systems/code division multiple access (UMTS/CDMA) or the $4^{th}$ generation (4G) based on long term evolution (LTE)/WiMAX etc. With one or more radio capability equipped on such smart devices, the one or more radio capability equipped on such smart device are able to connect to the internet to gain access to multitude of applications like audio/video streaming, navigation maps, social networking applications, games and plethora of over the top (OTT) services/applications in addition to operator/service provider services. Further, from user perspective ownership of such smart device is not restricted to one type of smart device where a user owns a smartphone, a smartwatch, a tablet or simply a group of devices are always present in the vicinity of the user. When the user is on the move both the operator/service provider services and the OTT services are available on the smart device through the cellular radio interface unless the user is travelling in car/bus/train where he can connect to the wireless LAN (WLAN) access point (AP) to gain access to OTT services.

Similarly, typically when the user is in home environment or office environment or any public place equipped with WLAN AP then WiFi based radio capability is used for accessing the OTT services on the smart device. In such cases, the operator/service provider services like voice calls, SMS etc are delivered through the cellular capability on the smart device. However, the cellular radio of the smart device may be in dormant/idle mode when there is no active session ongoing on the cellular interface in order to save battery power. Most personal computing devices have proximity connectivity capability like Bluetooth/WiFi to pair/associate with another smart device like smartphone, tablet etc. Such dormant/idle mode power consumption can be further minimized based on the methods disclosed in the invention wherein the dormant/idle mode operations of a first smart device are offloaded to a second smart device through a proximity interface such as Bluetooth/WiFi. The second smart device having cellular radio capability acts as a proxy for the first smart device to carry out one or more dormant/idle mode functions on behalf of the first device in addition to similar functions for the second smart device.

The first smart device referred above is not restricted to smartphone or tablet but could also cover wearable device like smartwatch, health bands, smart glasses, smart necklaces, etc. The second smart device referred above is not restricted to smartphone or tablet but could also cover WLAN AP having cellular capability for backhaul, electronic consoles/dashboards inside cars/bus/train having WiFi capability for proximity connectivity and cellular capability for backhaul. Even though the invention is illustrated in detail referring to wearable kind of device as the first smart device and smartphone kind of device as the second smart device the scope of the invention is equally applicable for the various categories of the first smart device and second smart device as the aforementioned. The description of the invention referring to wearable kind of device as the first smart device and smartphone kind of device as the second smart device may not be considered as limiting case for the applicability of the invention. The proximity radio capability mentioned above based on Bluetooth and/or WiFi through which the first smart device and the second smart device are paired/associated may not be considered as restrictive for the applicability of the invention because the proximity interface may also be LTE based ProSe interface. However, for simplicity the invention is illustrated based on Bluetooth/WiFi proximity interface since these are dominant interfaces seen in the field worldwide.

SUMMARY

The cellular radio in dormant/idle mode of a smart device would normally just monitor network page for mobile terminated calls, perform cell re-selection to support dormant/idle mode mobility, perform location update when triggered by non-access stratum (NAS) layer of the cellular radio so that network can keep track of the smart device for paging and may transmit or receive ProSe direct communication (D2D operation). Even though the smart device cellular radio is in dormant/idle mode performing very few basic operations like monitoring paging, cell re-selection, tracking area update etc., there is some amount of battery power consumed.

The dormant/idle mode power consumption can be further minimized based on the methods disclosed in the invention wherein the dormant/idle mode operations of a first smart device are offloaded to a second smart device through a proximity interface such as Bluetooth/WiFi. The second smart device including cellular radio capability acts as a proxy for the first smart device to carry out one or more dormant/idle mode functions on behalf of the first device in addition to similar functions for the second smart device.

When the first smart device has offloaded one or more dormant/idle mode functions to the second smart device then the cellular radio capability of the first smart device can be completely switched off but the proximity radio capability like Bluetooth/WiFi is active. The first smart device and the second smart device are paired/associated with each other through the proximity radio capability so that the second smart device can transfer the dormant/idle context back to first smart device in case of network page and/or refresh of NAS security context for the first smart device.

The following aspects with the offload of one or more dormant/idle mode functions from the first smart device to the second smart device are addressed in the disclosed invention: Smart device Identity sharing, PLMN selection, Cell re-selection, Tracking area update and ProSe direct communication (D2D operations) in idle mode.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate a flow chart for a user equipment (UE) operations for a first smart device when one or more idle mode functions are offloaded to a second smart device according to one embodiment.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

FIGS. 1 through 12, discussed below, and the various embodiments of the present disclosure used to describe the principles of the present disclosure in this patent document are by way of illustration only and should not be construed in any way to limit the scope of the disclosure. Those skilled in the art will understand that the principles of the present disclosure may be implemented in any suitably arranged communication technologies. Hereinafter, operation principles of exemplary embodiments of the present disclosure will be described in detail with reference to accompanying drawings. In the following description of the present disclosure, a detailed description of known configurations or functions incorporated herein will be omitted when it is determined that the detailed description may make the subject matter of the present disclosure unclear. Terms described later are defined in consideration of the functions of the present disclosure, but may vary according to the intention or convention of a user or operator. Therefore, the definitions may be made based on contents throughout the specifications.

Figure 1A:
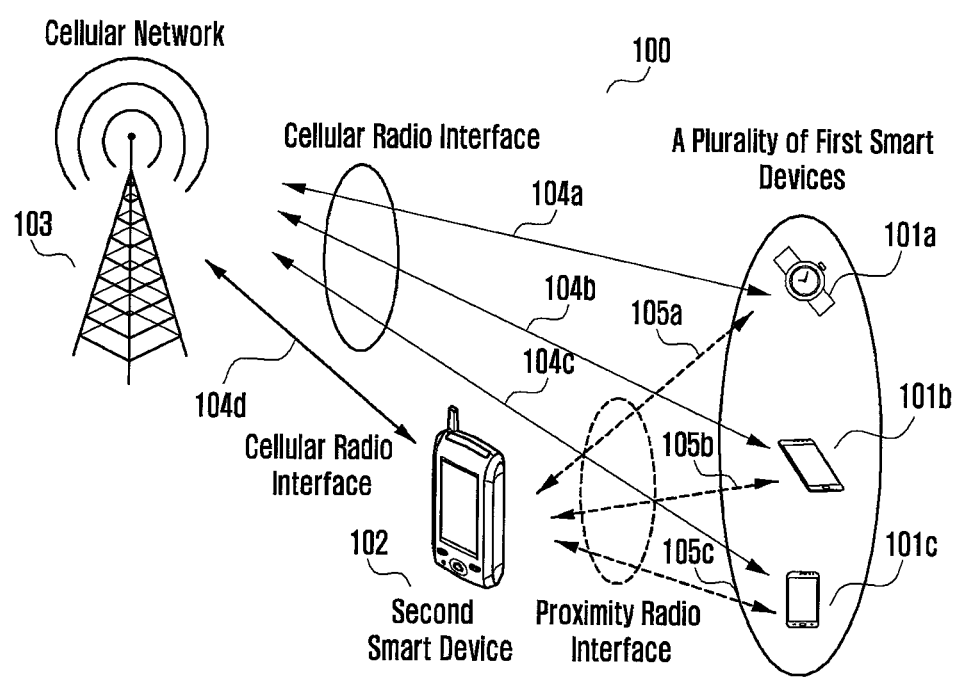
FIGS. 1A and 1B illustrate an offload of one or more dormant/idle functions using proximity radio interface from a plurality of first smart devices including cellular radio capability to a second smart device including cellular radio capability according to one embodiment.

FIG. 1A illustrates an offload of one or more dormant/idle functions using proximity radio interface from a plurality of first smart devices including cellular radio capability to a second smart device including cellular radio capability. FIG. 1A depicts the cellular network environment 100 where several smart devices are connected to the cellular network 103. A plurality of first smart devices 101a, 101b, 101c so on and so forth are connected to the cellular network 103 using their cellular radio capability through the cellular radio interface 104a, 104b, 104c respectively. A second smart device 102 is also connected to the cellular network 103 using its cellular radio capability through the cellular radio interface 104d. The cellular network 103 comprises of a plurality of network nodes like the eNodeBs (eNBs) responsible for radio functions, mobility management entity (MME) responsible for control functions like session and mobility management, data gateways like serving gateway (SGW) and PGW responsible for routing data packets between the eNB and the external network. For the sake of explanation of disclosed invention the cellular network 103 is assumed to be long term evolution (LTE) based comprising the evolved universal terrestrial radio access network (E-UTRAN) and evolved packet core (EPC). The disclosed invention is also applicable to cellular network based on universal mobile telecommunications system (UMTS) by extending the disclosed methods in the context of procedures relevant for universal terrestrial radio access network (UTRAN).

The plurality of first smart devices 101*a*, 101*b*, 101*c* so on and so forth may be connected to the second smart device 102 using their proximity radio capability through the proximity radio interface 105*a*, 105*b*, 105*c* respectively. For the sake of explanation of disclosed invention the proximity radio interface 105*a*, 105*b*, 105*c* is assumed to be Bluetooth or WiFi based having a range of few meters to several tens of meters. The disclosed invention is also applicable if the proximity interface is LTE based using the ProSe interface.

Figure 1B:
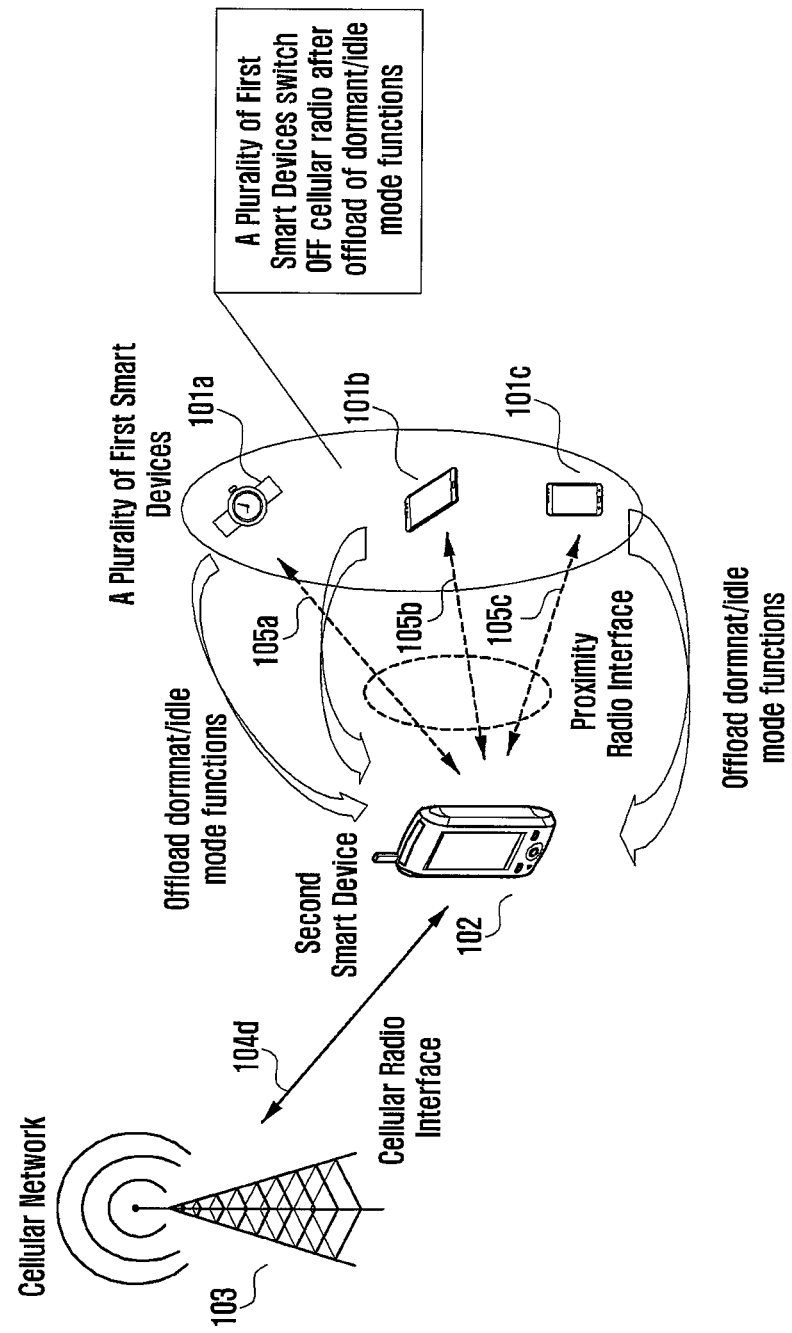

FIG. 1B illustrates the network environment 100 wherein it is assumed a plurality of first devices 101*a*, 101*b*, 101*c* including cellular radio capability and proximity radio capability and the second smart device 102 also having cellular radio capability and proximity radio capability belong to the same registered public land mobile network (PLMN). When the smart devices 101*a*, 101*b*, 101*c* and 102 are in the vicinity of each other either in a stationary environment like home/office or mobility environment like car/bus/train these devices perform one or more dormant/idle mode functions like monitoring paging, cell re-selection, tracking area update when triggered by NAS layer, may transmit or receive ProSe direct communication (e.g., D2D operation) independently. Since all the devices are in the same vicinity and belong to the same PLMN the dormant/idle mode functions like cell re-selection and tracking area update may be triggered at more or less similar time instances for majority of the devices. Since the devices are performing independent functions using the cellular radio capability the devices consume battery power to perform those functions.

Further, it is possible that a first smart device 101*a* may be connected to second smart device 102 when in vicinity for most of the time. Such scenario is possible if first smart device 101*a* is a smartwatch or wearable and the second smart device 102 is a smartphone belonging to the same user. In such scenario the dormant/idle mode power consumption of first smart device 101*a* can be further minimized based on the methods disclosed in the invention wherein one or more dormant/idle mode functions of a first smart device 101*a* are offloaded to a second smart device 102 through a proximity interface such as Bluetooth/WiFi. The second smart device 102 including cellular radio capability acts as a proxy for the first smart device 101*a* to carry out one or more dormant/idle mode functions on behalf of the first smart device 101*a* in addition to similar functions for the second smart device. When the first smart device 101*a* has offloaded one or more dormant/idle mode functions to the second smart device 102 then the cellular radio capability of the first smart device 101*a* can be completely switched off but the proximity radio capability like Bluetooth/WiFi is active. This would result in significant power saving for the first smart device 101*a*. The power consumption of second smart 102 may be marginally increased since the second smart device 102 acts a proxy for first smart device 101*a*. However, the second smart device 102 may have superior capability in terms of battery source compared to smart device 101*a* so the additional marginal power consumption for the proxy function may not adversely impact the power consumption of second smart device 102.

In another scenario, the second smart device 102 can be a WLAN AP including cellular radio capability as the backhaul to connect to the network typically seen in home or office environment. In such scenario the dormant/idle mode power consumption of a plurality of first smart devices 101*a*, 101*b*, 101*c* can be further minimized based on the methods disclosed in the invention wherein one or more dormant/idle mode functions of a plurality of first smart devices 101*a*, 101*b*, 101*c* are offloaded to a second smart device 102 through a proximity interface such as WiFi. This would result in significant power saving for the plurality of first smart devices 101*a*, 101*b*, 101*c*. The power consumption of the second smart device 102, if WLAN AP is not a major concern, is permanently connected to power source. However, in such scenario, the second smart device 102 may experience slightly increased processing load since the second smart device 102 acts as proxy for a plurality of the first smart devices. The second smart device 102 may have superior capability in terms of processor power compared to smart devices 101*a*, 101*b*, 101*c* because of the larger form factor of the second smart device 102 if the second smart device 102 is WLAN AP so the additional processing load for the proxy function may not adversely impact the processing capability of the second smart device 102. In an embodiment the second smart device can be a multi subscriber identity module (SIM) device. In an embodiment the second smart device uses the protocol stack corresponding to SIM from a plurality of SIMs such that the PLMN selected by the second smart device is same PLMN as the first smart device. In an embodiment a multi SIM second smart device may be handling dormant/idle operations of one or more first smart devices on a first SIM and handling one or more first smart devices on a second SIM and so on.

Figure 2:
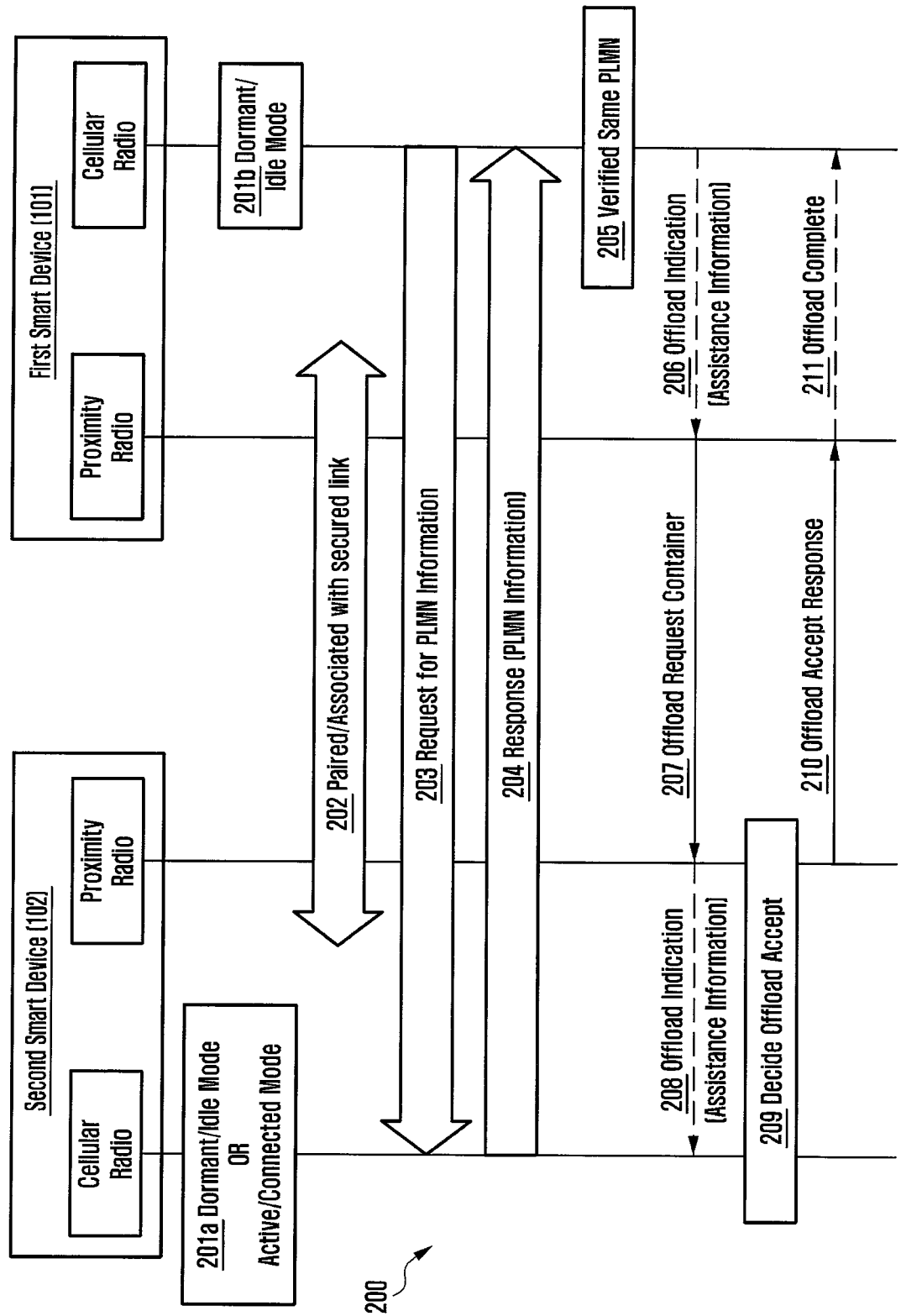
FIG. 2 illustrates a message sequence flow for an offload of dormant/idle mode operation according to one embodiment.

FIG. 2 illustrates a message sequence flow 200 for an offload of dormant/idle mode operation from a first smart device (101) to a second smart device (102). At step 201, the second smart device (102) may be either in dormant/idle mode or active/connected mode from the cellular radio interface perspective. At step 201*b*, the first smart device (101) is in dormant/idle mode from the cellular radio interface perspective. At step 202, the first smart device (101) connects to the second smart device (102) for example based on Bluetooth connection set-up and pairing. When the proximity radio (i.e. Bluetooth radio) in the first smart device (101) and the second smart device (102) is activated, then the first smart device (101) may send discovery signal for Bluetooth devices in the proximity and on detecting the second smart device (102), the association protocol between the first smart device (101) and the second smart device (102) establish the proximity connectivity between the proximity radios of the paired smart devices. This establishment of association between the proximity radios of two devices based on Bluetooth protocol is called pairing. During the pairing procedure the first smart device (101) and the second smart device (102) may mutually authenticate each other if the first smart device (101) and the second smart device (102) are trusted partners to establish the secured proximity link. After pairing the devices, the two associated proximity radios of the two devices are allowed to transfer data using the secured proximity interface for any application specific exchange of information using Bluetooth protocol.

In another example such secured proximity link between the first smart device (101) and the second smart device (102) can also be established using WiFi protocol. At step 203, the first smart device (101) intends to offload dormant/idle operation to the second smart device (102) and therefore request for PLMN information concerning the PLMN on which the second smart device (102) is registered. The PLMN information is requested on the proximity interface using the protocol associated with proximity radio interface. This means the contents of the request message are transparent to proximity radio and can be considered as application data from proximity radio perspective such that PLMN request is in a container regardless of the proximity protocol used.

The PLMN selection for the first smart device (101) and the second smart device is in accordance to PLMN selection procedures specified in 3GPP TS 23.122. At step 204, the second smart device (102) provides its registered PLMN information and optionally UE identity of the second smart device to the first smart device (101) through the secured proximity interface. At step 205, the first smart device (101) verifies the registered PLMN of the second smart device (102) and if the first smart device (101) and the second smart device (102) match with the first smart device (101) and the second smart device (102) own registered PLMN then in steps 206, 207 and 208 the first smart device sends dormant/idle mode offload indication along with assistance information in the form of offload request container. The offload indication messages shown in step 206 and step 208 are inter-radio messages within the first smart device and the second smart device. These inter-radio messages are information exchanged between the cellular radio and proximity radio within the smart device which is transparent from the perspective of proximity radio and can be considered as application data.

The exchange of inter-radio messages between the cellular radio and proximity radio within the smart device involves co-ordination between the cellular radio and proximity radio which could be handled by a Radio Interface Layer. The proximity radio acts as relay to transmit or receive the inter-radio message on the proximity radio interface. At step 209, the second smart device (102) accepts the offload request from the first smart device (101) and therefore sends the offload accept response at step 210. With the reception of inter-radio message offload complete at step 211 the first smart device (101) has successfully offloaded one or more idle mode functions to the second smart device (102). The various steps mentioned in FIG. 2 illustrates the generalized procedure for offload of dormant/idle mode operation from the first smart device to the second smart using the proximity radio interface; therefore either some of the steps can be combined, sequence of some steps can be modified or some steps can be omitted without deviating from the spirit of the illustrated procedure.

Figure 3:
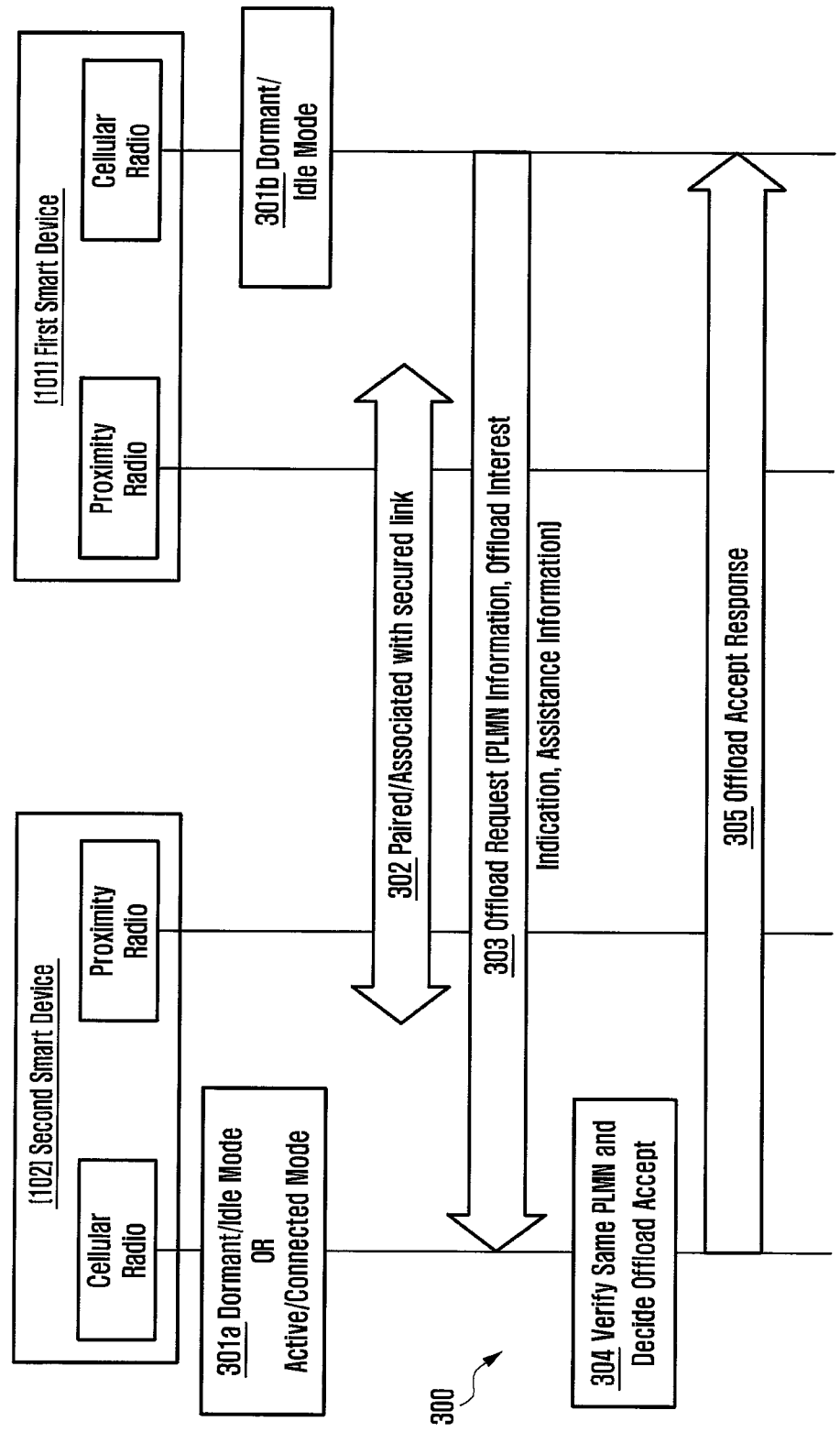
FIG. 3 illustrates a message sequence flow for a offload of dormant/idle mode operation according to another embodiment.

FIG. 3 illustrates a message sequence flow 300 depicting an alternative method for the offload of dormant/idle mode operation from a first smart device (101) to a second smart device (102). At step 301, the second smart device (102) may be either in dormant/idle mode or active/connected mode from the cellular radio interface perspective. At step 301b the first smart device (101) is in dormant/idle mode from the cellular radio interface perspective. At step 302, the first smart device (101) connects to the second smart device (102) for example based on either Bluetooth pairing protocol or WiFi association protocol to establish the proximity connectivity. In step 303, the first smart device (101) provides the PLMN information concerning the PLMN on which the first smart device (101) is registered along with dormant/idle mode offload interest indication and assistance information.

If the registered PLMN of the second smart device (102) matches with that of the first smart device (101) and at step 304 if the second smart device (102) decides to accept the offload interest indication from first smart device (101) then the second smart device responds to the first smart device (101) with accept message. The offload accept response is sent providing UE identity of the second smart device (102) along with accept indication at step 305. If the decision is reject then a reject indication is conveyed to the first smart device (101). With the reception of offload accept response at step 305 the first smart device (101) has successfully offloaded one or more idle mode functions to second smart device (102). The various steps mentioned in FIG. 3 illustrates the generalized alternative procedure for offload of dormant/idle mode operation from the first smart device to the second smart using the proximity radio interface; therefore either some of the steps can be combined, sequence of some steps can be modified or some steps can be omitted without deviating from the spirit of the illustrated procedure.

Figure 4:
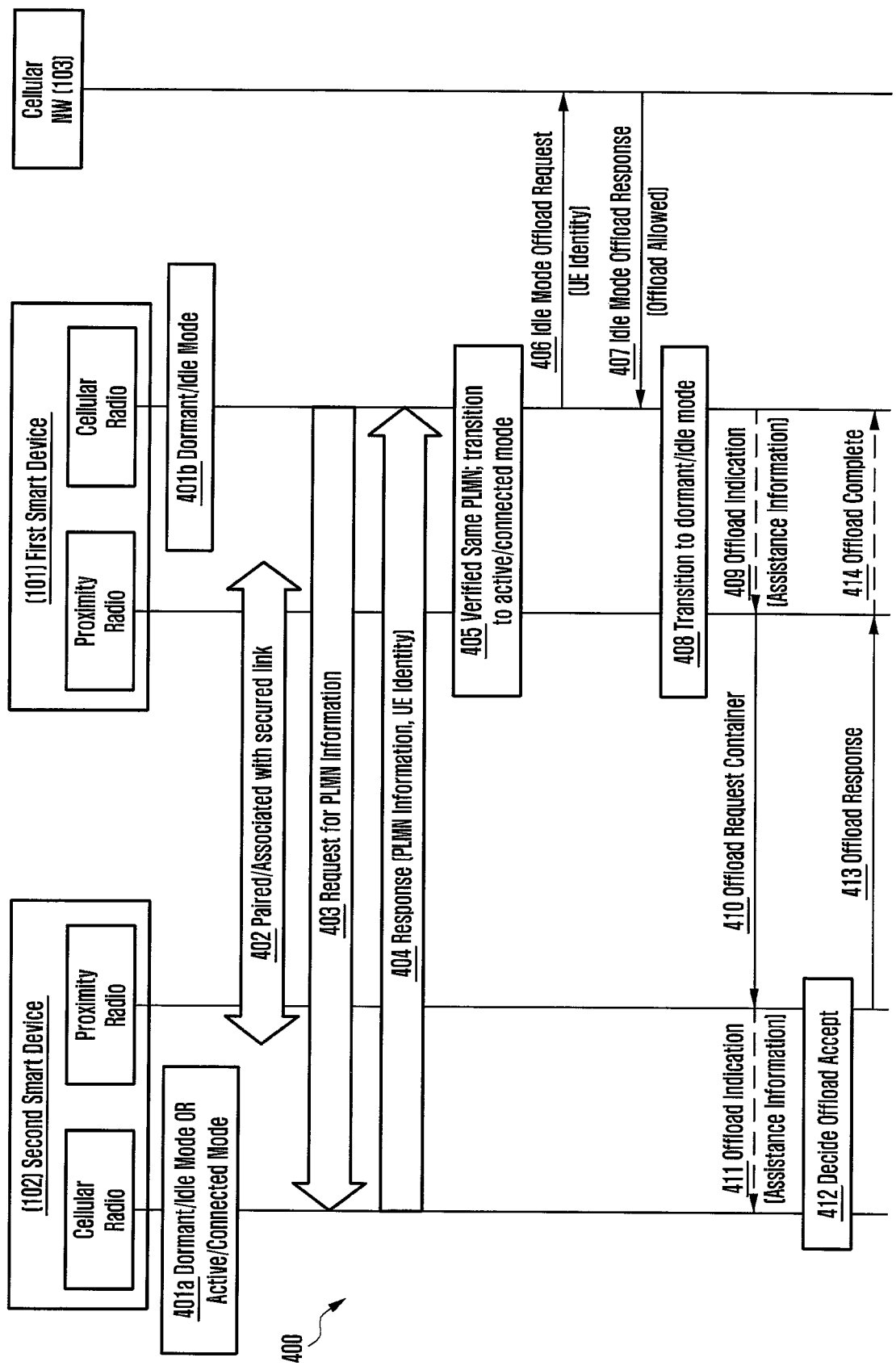
FIG. 4 illustrates a message sequence flow for a network controlled offload of dormant/idle mode operation according to one embodiment.

FIG. 4 illustrates a message sequence flow 400 depicting an alternative method for the network controlled offload of dormant/idle mode operation from a first smart device (101) to a second smart device (102). All the steps shown in message sequence flow 400 are similar to the steps shown in message sequence flow 200 except step 405, 406 and 407. At step 405, the first smart device (101) verifies the registered PLMN of the second smart device (102) and if the first smart device (101) matches with the first smart device own registered PLMN then the cellular radio of first smart device (101) transitions to active/connected mode from dormant/idle mode. At step 406, the first smart device (101) sends idle mode offload request message to the cellular network (103) including the UE identity provided by the second smart device (102).

The UE identity concerning the second smart device can be for example the IMSI or GUTI associated with second smart device (102). The UE identity associated with the second smart device (102) can be any UE identity which the cellular network (103) can understand and identify the second smart device (102). If the cellular network (103) accepts the offload request then the cellular network (1030 responds to the first smart device (101) with offload response message in step 407. The offload response message includes the accept indication. If the decision is reject then a reject indication is conveyed to the first smart device (101) in the offload response message. The offload request/response messages can be NAS messages and the decision to allow/dis-allow idle mode offload is taken by the MME in the cellular network (103). Based on the UE identity of the second smart device (102) which the cellular network (103) can understand and identify the second smart device (102), the cellular network (103) can determine the authenticity of any procedure carried out by the second smart device (102) on behalf of the first smart device (101). At step 408, the cellular radio of first smart device (101) transitions from active/connected mode to dormant/idle mode and completes the rest of the procedure to offload idle mode operations to the second smart device (102). The various steps mentioned in FIG. 4 illustrates the generalized network controlled procedure for offload of dormant/idle mode operation from the first smart device to the second smart device; therefore either some of the steps can be combined, sequence of some steps can be modified or some steps can be omitted without deviating from the spirit of the illustrated procedure.

Figure 5:
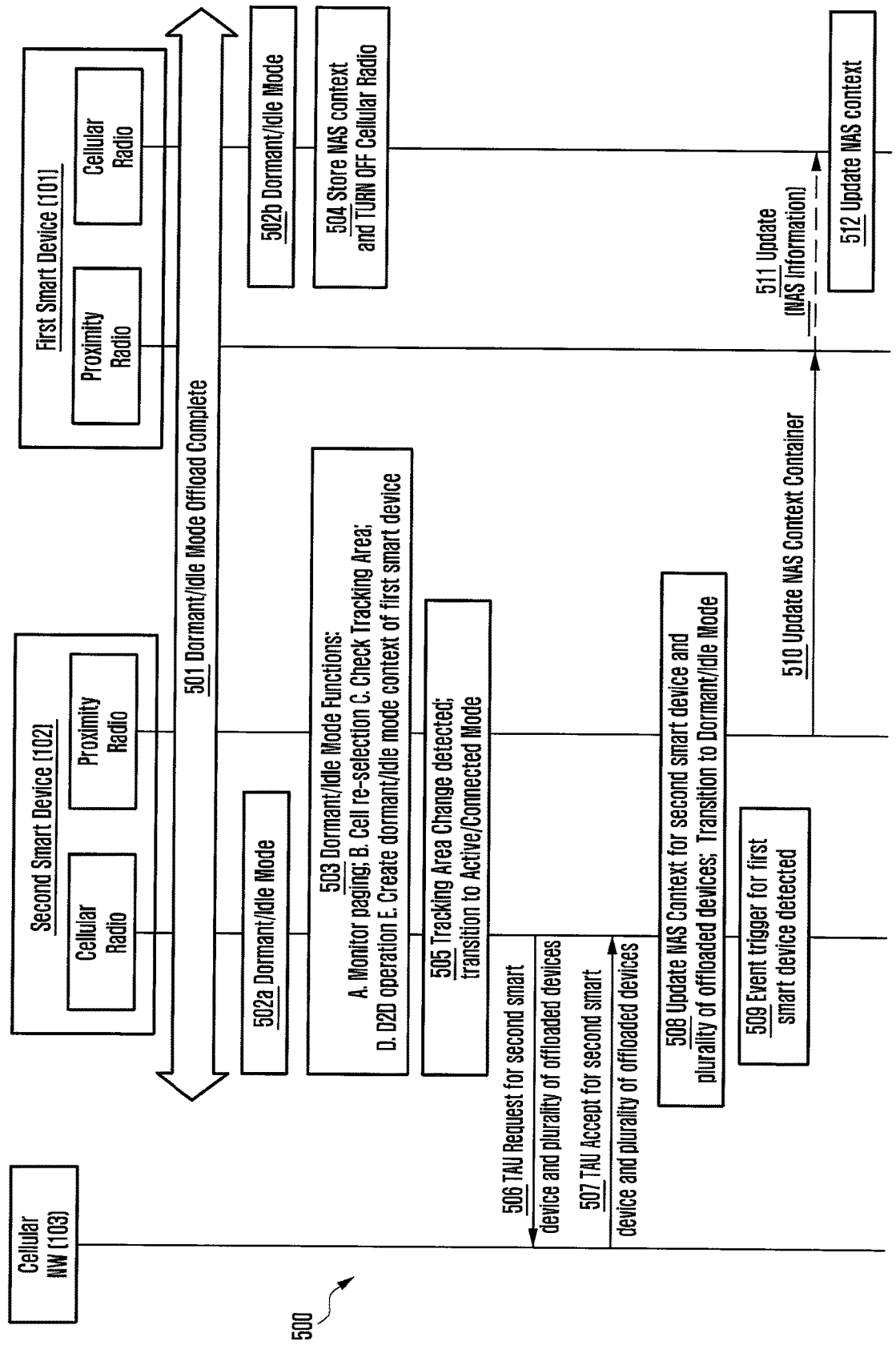
FIG. 5 illustrates a tracking area update procedure on behalf of a plurality of first smart devices that includes offloaded dormant/idle mode operation according to one embodiment.

FIG. 5 illustrates a message sequence flow 500 depicting the tracking area update procedure performed by a second smart device (102) on behalf of a first smart device (101). At step 501, the procedure to offload idle mode operations to the second smart device (102) is performed by the first smart device (101) using any of the methods shown in FIG. 2, FIG. 3 or FIG. 4. At step 502a and step 502b, the first smart device (101) and the second smart device (102) are in dormant/idle mode from the cellular radio interface perspective. At step 504, the first smart device (101) store the first smart device's NAS context associated with the cellular radio and turn OFF the cellular radio while keeping the proximity radio activated and associated with the second smart device (102). The proximity radio of the first smart device (101) periodically keeps checking the pairing/association status with proximity radio of the second smart device (102) on the proximity radio interface. At step 503, the second smart device (102) whose cellular radio is in dormant/idle mode performs one or more dormant/idle functions such as paging monitoring, cell-reselection, performing tracking area update if triggered by NAS layer and device-to-device (D2D) operations according to procedures specified in 3GPP TS 36.304.

On reception of the assistance information from the first smart device (101) the second smart device (102) creates dormant/idle mode context of the first smart device (101). Assuming the second smart device (102) is performing cell re-selection due to idle mode mobility which requires the cellular radio of the second smart device (102) to acquire system information of re-selected cell. Since the first smart device (101) is paired/associated with the second smart device (102), it may be assumed the re-selected cell by the second smart device (102) would be potential cell for camping for the first smart device (101) if the second smart device (102) turns ON the cellular radio. From the system information of the re-selected cell the second smart device (102) receives the tracking area code (TAC) which is provided to the NAS layer of cellular radio of second smart device (102). Based on the received TAC the NAS layer may trigger the tracking area update (TAU) for the second smart device (102) according to the criteria specified in 3GPP TS 24.301. At step 505, if the tracking area update is triggered by the NAS layer based on the TAC received from access stratum layer (AS) then the cellular radio transition from dormant/idle mode to active/connected mode to perform the TAU procedure. This includes performing random access on the re-selected cell and establishing RRC connection and sending the NAS message i.e tracking area update (TAU) request message to the cellular network (103) in step 506.

The TAU request message includes the contents for the second smart device (102) for example the mandatory parameter GUTI (User Equipment identity at MME level) for second smart device (102) and many other optional parameters. This TAU request message may be sent using the NAS security context of the second smart device (102) i.e as NAS PDU integrity protected by the NAS integrity key of the second smart device (102). This TAU message may include a flag to indicate to the cellular network (103) that the TAU request message also include contents for a plurality of first smart devices. The first smart device (101) contents included in the TAU request message includes the GUTI of first smart device (101), a message authentication code (MAC-i) generated using the NAS integrity key associated with the first smart device (101) and some optional parameters like the parameters of the paging cycle of the first smart device (101). The assistance information received from the first smart device (101) during the offload includes at least: the UE identity associated with first smart device (101), list of MAC-i, paging cycle parameters and other information. This TAU request message therefore piggybacks the TAU contents for first smart device (101) when TAU is triggered by NAS layer of the second smart device (102). The TAU piggyback flag in TAU request message may indicate to the cellular network (103) that the TAU message also includes TAU contents for a plurality of first smart devices. Based on the GUTI and MAC-i associated with the first smart device (101) the cellular network (103) can authenticate the first smart device (101) and trust the TAU contents associated with the first smart device (101) if the offloaded idle mode operation is not network controlled. In the alternative where the idle mode operation is network controlled, then there is no need to include the MAC-i associated with the first smart device (101) in the TAU request message because the cellular network (103) has prior knowledge that second smart device (102) may perform some procedures with the cellular network (103) on behalf of first smart device (101).

At the cellular network (103) if the GUTI associated with first smart device (101) is not identified by the MME handling the second smart device (102) then the GUTI associated with first smart device (101) is forwarded to appropriate MME based on the MME identifier (MMEI) in the GUTI. The MMEI shows which MME allocates the GUTI and an M-TMSI, a temporary value that uniquely identifies the first smart device (101) in that particular MME. Based on the MME interaction at the cellular network (103) the MME updates the location registration for the second smart device (102) and the first smart device (101). If there is MME re-location for the first smart device (101) then possibly a new GUTI is allocated to the first smart device (101). MME re-location may also result in refresh of the NAS security key associated with the first smart device (101). At step 507, the MME sends the TAU accept message to the second smart device (102) which may include updated NAS information for the second smart device (102) and for a plurality of first smart devices. At step 508, the NAS information associated with the second smart device (102) is updated and also the NAS information associated with the plurality of first smart devices is updated. The new NAS information is updated in the dormant/idle mode context of the first smart device (101) maintained in the second smart device (102).

The cellular radio of second smart device (102) transitions to dormant/idle mode from active/connected mode. If the dormant/idle mode context associated with the first smart device (101) maintained in the second smart device (102) is updated then an event is triggered for the first smart device at step 509. A NAS Context container to update the NAS information is sent by the second smart device (102) to the first smart device (101) on the proximity radio interface at step 510 and thereafter at step 511 as an inter-radio message. At step 512, the first smart device (101) just updates the stored NAS context with the new information received in the NAS Context container without turning ON the cellular radio. Example of new NAS information could be updated paging cycle parameters for the first smart device (101) or new GUTI for first smart device (101) which does not need the first smart device (101) to turn ON the cellular radio. For successive TAU request sent to the cellular network (103) on behalf of the first smart device (101), a unique MAC-i needs to be included for each TAU request message along with the TAU contents associated with first smart device (101). The second smart device (102) receives a list of MAC-i from the first smart device (101) as assistance information and therefore on exhausting the list of MAC-i the second smart device (102) can request a new list for MAC-i from the first smart device (101). The various steps mentioned in FIG. 5 illustrates the generalized tracking area update procedure performed by second smart device on behalf of the first smart device; therefore either some of the steps can be combined, sequence of some steps can be modified or some steps can be omitted without deviating from the spirit of the illustrated procedure.

Figure 6A:
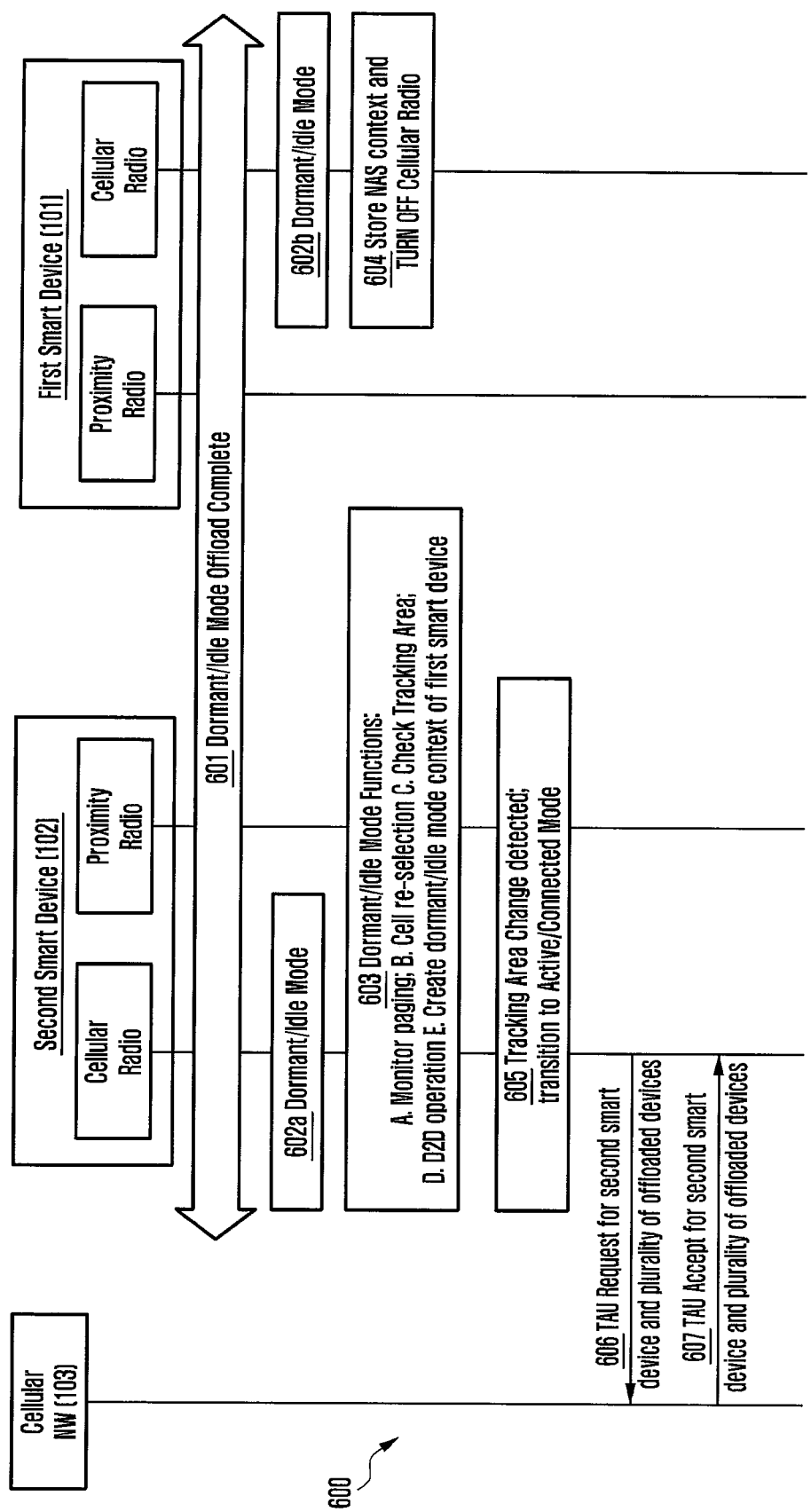
FIGS. 6A and 6B illustrate a tracking area update procedure on behalf of a plurality of first smart devices that includes offloaded dormant/idle mode operation according to another embodiment.
Figure 6B:
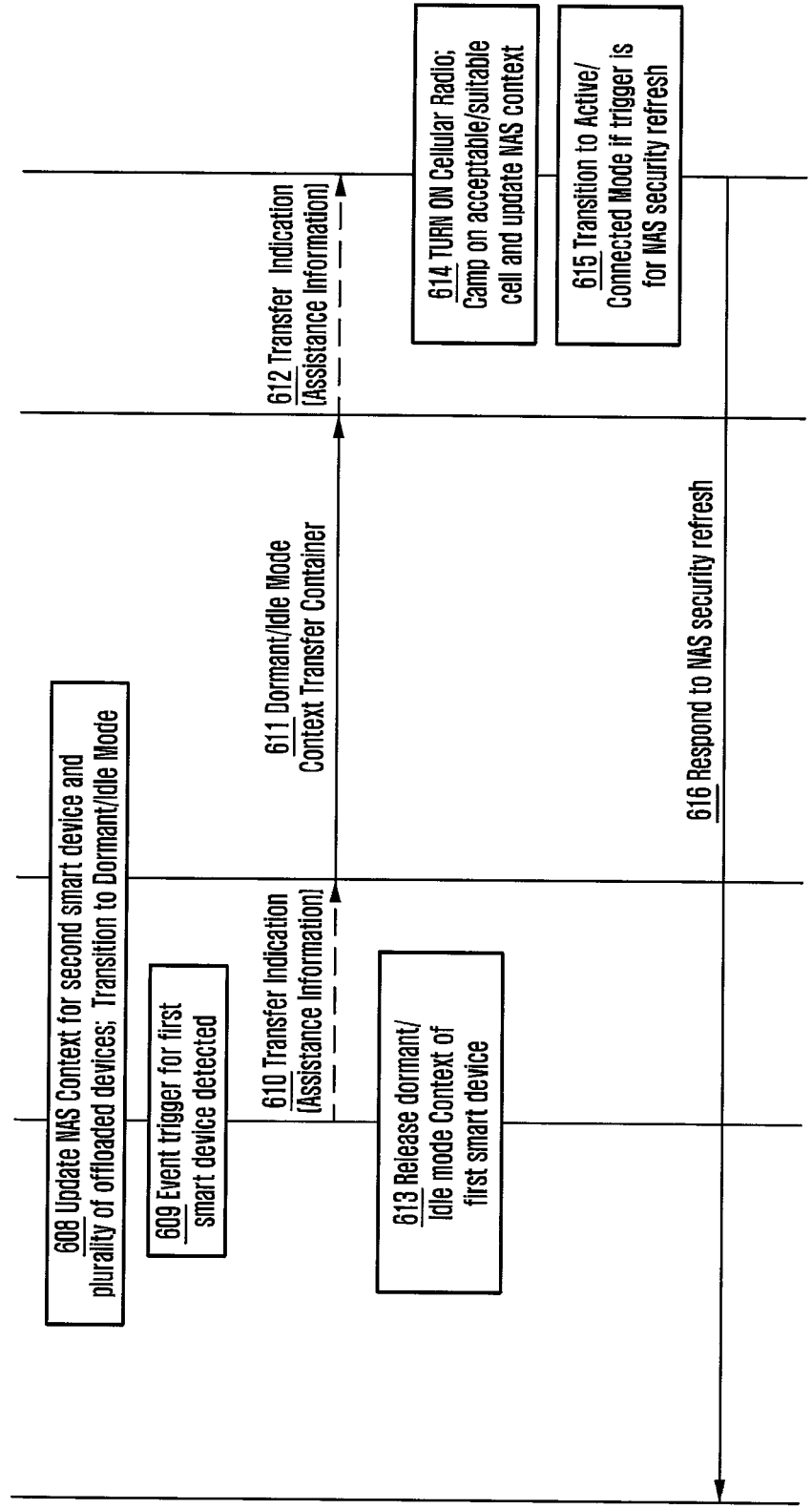

FIGS. 6A and 6B illustrate a message sequence flow 600 depicting the tracking area update procedure performed by a second smart device (102) on behalf of a first smart device (101) and there is need to update the NAS security context associated with cellular radio of the first smart device (101).

All the steps shown in message sequence flow 600 are similar to the steps shown in message sequence flow 500 except that in the TAU accept message in step 607 there is an indication to refresh the NAS security key associated with the first smart device in addition to update of the NAS information associated with the first smart device (101). For example if a new GUTI is allocated to the first smart device (101) due to MME re-location and if refresh of NAS security key associated with the first smart device (101) is decided by the cellular network (103) then a NAS key refresh indication associated with the first smart device (101) is sent to second smart device (102) in the TAU accept message in step 607. In such scenario after updating the NAS context for plurality of device(s) the second smart device (102) transition to dormant/idle mode at step 608 and a trigger event for the first smart device (101) is generated at step 609.

The trigger event leads to sending the context transfer container to the first smart device (101) on the proximity radio interface including the event trigger cause value. In this case the event trigger cause value is the indication for refresh of the NAS security key associated with the first smart device (101). The context transfer message is sent through the inter-radio messages 610 and 612 respectively and on the proximity radio interface as context transfer container at step 611 which includes assistance information from the second smart device in addition to the trigger event cause value. At step 614 on the receiving the trigger event cause value associated with refresh of NAS security key, the first smart device (101) updates the stored NAS context with the new information received in the context transfer container and turns ON the cellular radio. Further, the assistance information received from the second smart device (102) may include some system information parameters associated with the cell on which the second smart device (102) is camped. The first smart device (101) camps on a suitable cell and speeds up the camping based on the received system information parameters from the second smart device (102). At step 615, the first smart device (101) transition to active/connected mode which involves performing random access on the camped cell, establishing RRC connection with the cellular network (103) and sending the NAS message to refresh the NAS security context at step 616. The various steps mentioned in FIG. 6 illustrates the generalized tracking area update procedure performed by the second smart device on behalf of the first smart device and there is need to update the NAS security context associated with first smart device; therefore either some of the steps can be combined, sequence of some steps can be modified or some steps can be omitted without deviating from the spirit of the illustrated procedure.

Figure 7A:
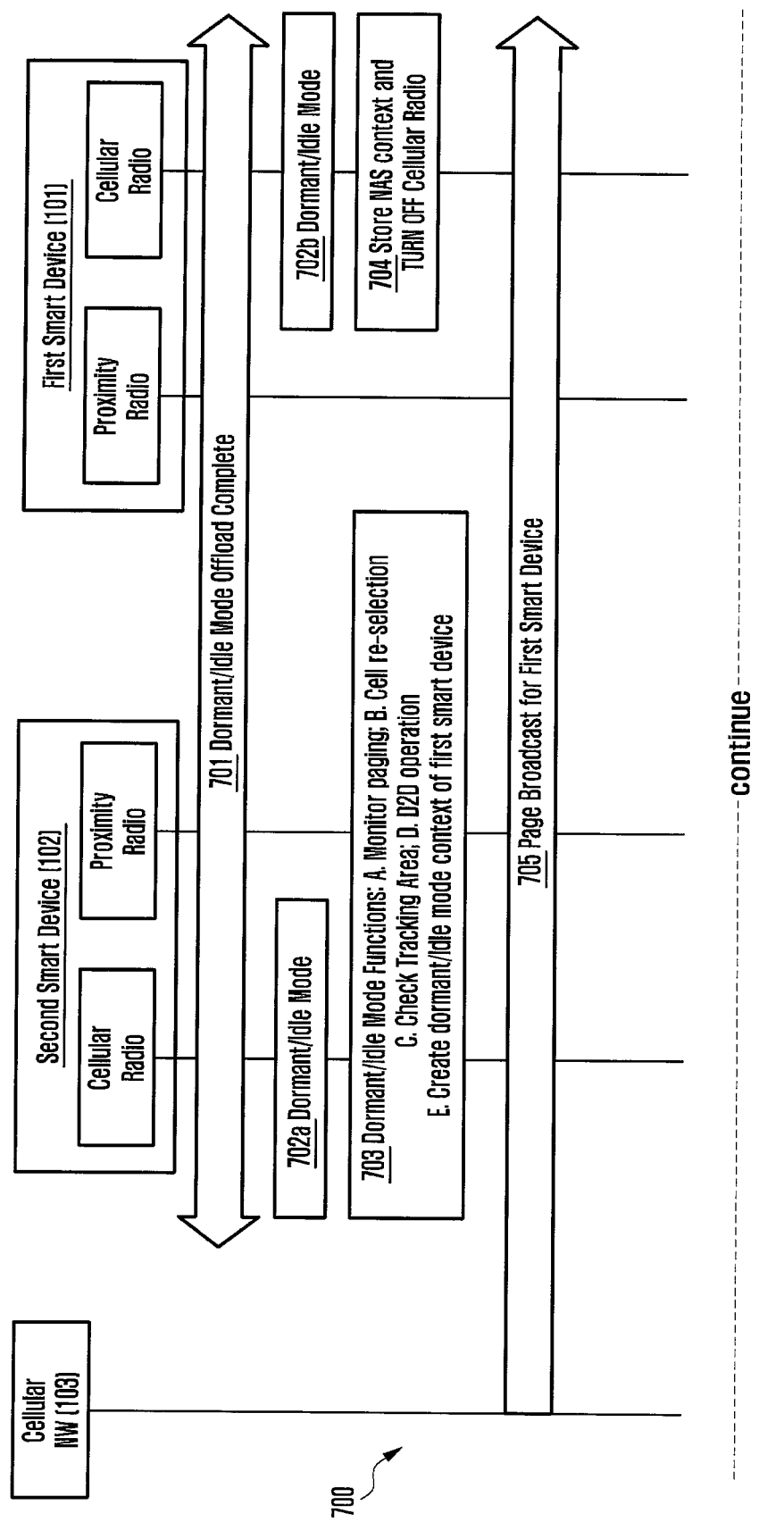
FIGS. 7A and 7B illustrate a paging monitoring procedure on behalf of a plurality of first smart devices that includes offloaded dormant/idle mode operation according to one embodiment.
Figure 7B:
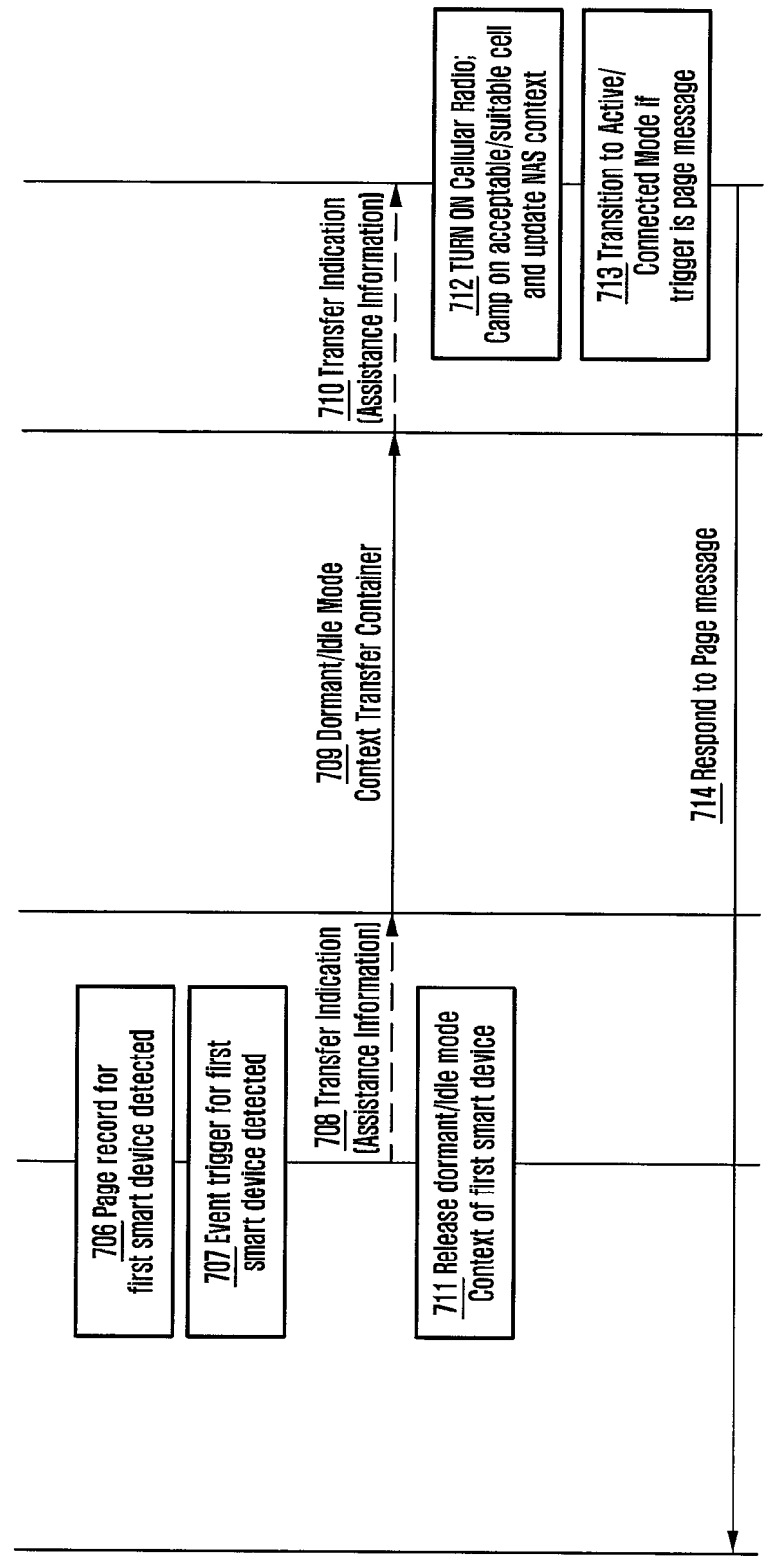

FIGS. 7A and 7B illustrate a message sequence flow 700 depicting the paging monitoring procedure performed by a second smart device (102) on behalf of a first smart device (101) which has offloaded the dormant/idle mode operation. All the steps shown in message sequence flow 700 are similar to the steps shown in message sequence flow 500 until step 704. Based on the assistance information sent by the first smart device (101) to the second smart device (102) as shown in step 207 as depicted in FIG. 2, the second smart device (102) shall be able to monitor paging on behalf of first smart device (101) when there is page broadcast from the cellular network (103) at step 705. The cellular network (103) is able to send the page for first smart device (101) at step 705 in the area where the second smart device (102) is located based on the tracking area update procedure performed by the second smart device (102) on behalf of first smart device (101).

The assistance information for paging channel monitoring includes the parameters for paging cycle associated with first smart device (101) and the user equipment (UE) identity associated with first smart device (101). The UE identity associated with the first smart device can be at least one of: the IMSI and/or S-TMSI associated with the first smart device (101), the UE identity hashed by a hashing function and the GUTI associated with the first smart device (101). Based on the paging cycle parameters and the UE identity in the form of IMSI, the second smart device (102) can determine the paging frame and the paging opportunity associated with the first smart device (101) based on the equation specified in 3GPP specification TS 36.304. Once the paging frame and paging opportunity associated with first smart device (101) is determined then the second smart device shall be able to detect page record for the first smart device (101) sent by the cellular network (103) on the paging channel at step 706. If a page record addressed to the UE identity matches with the UE identity associated with first smart device (101) shared with second smart device (102) then at step 707 an event trigger is detected for the first smart device (101). Apart from the page record for mobile terminated call for the first smart device (101) the paging message may include at least notification for system information modification, indication for natural disaster like ETWS, CMAS notification.

The trigger event leads to sending the context transfer container to the first smart device (101) on the proximity radio interface including the event trigger cause value. In this case the event trigger is the indication for one of: network page for the first smart device (101) for a mobile terminated call, system information modification cause value, ETWS notification cause value, CMAS notification cause value. The context transfer message is sent through the inter-radio messages 708 and 710 respectively and on the proximity radio interface as context transfer container at step 709. The context transfer container includes assistance information from second smart device (102) in addition to the event trigger cause value. At step 712 on the receiving, the event trigger cause value associated with network page, the first smart device (101) updates the stored NAS context with any new information received in the context transfer container and turns ON the cellular radio. Further, the assistance information received from the second smart device (102) may include some system information parameters associated with the cell on which the second smart device (102) is camped. If the event trigger cause value is mobile terminated call then the page record for the first smart device (101) detected by the second smart device (102) is included in the context transfer container. The first smart device (101) camps on a suitable cell and speeds up the camping based on the received system information parameters from the second smart device (102). At step 713, the first smart device (101) transition to active/connected mode which involves performing random access on the camped cell, establishing RRC connection with the cellular network (103) and responding to network page if the event trigger cause value is mobile terminated call.

If event trigger cause value is system information modification or ETWS notification or CMAS notification then after camping on a suitable cell or acceptable cell the first smart device performs the necessary actions as specified in 3GPP specification TS 36.331 after reception of paging message. In an alternative instead of sharing the IMSI directly as the UE identity associated with the first smart device (101), the UE identity in the form of IMSI mod 1024; wherein the mod indicates modulo operation; can be shared with the second smart device (102) for identifying the paging frame of the first smart device. The hashed IMSI/S-TMSI or the S-TMSI can be shared with the second smart device (102) to identify the page record associated with the first smart device (101). Within the paging frame which corresponds to a radio frame comprising 10 subframes; there is at most one paging opportunity for a cellular device. The first smart device (101) may provide information on the paging opportunity corresponding to the subframe number within the paging frame to the second smart device (102). The various steps mentioned in FIG. 7 illustrates the generalized the paging monitoring procedure performed by the second smart device on behalf of the first smart device; therefore either some of the steps can be combined, sequence of some steps can be modified or some steps can be omitted without deviating from the spirit of the illustrated procedure.

Figure 8:
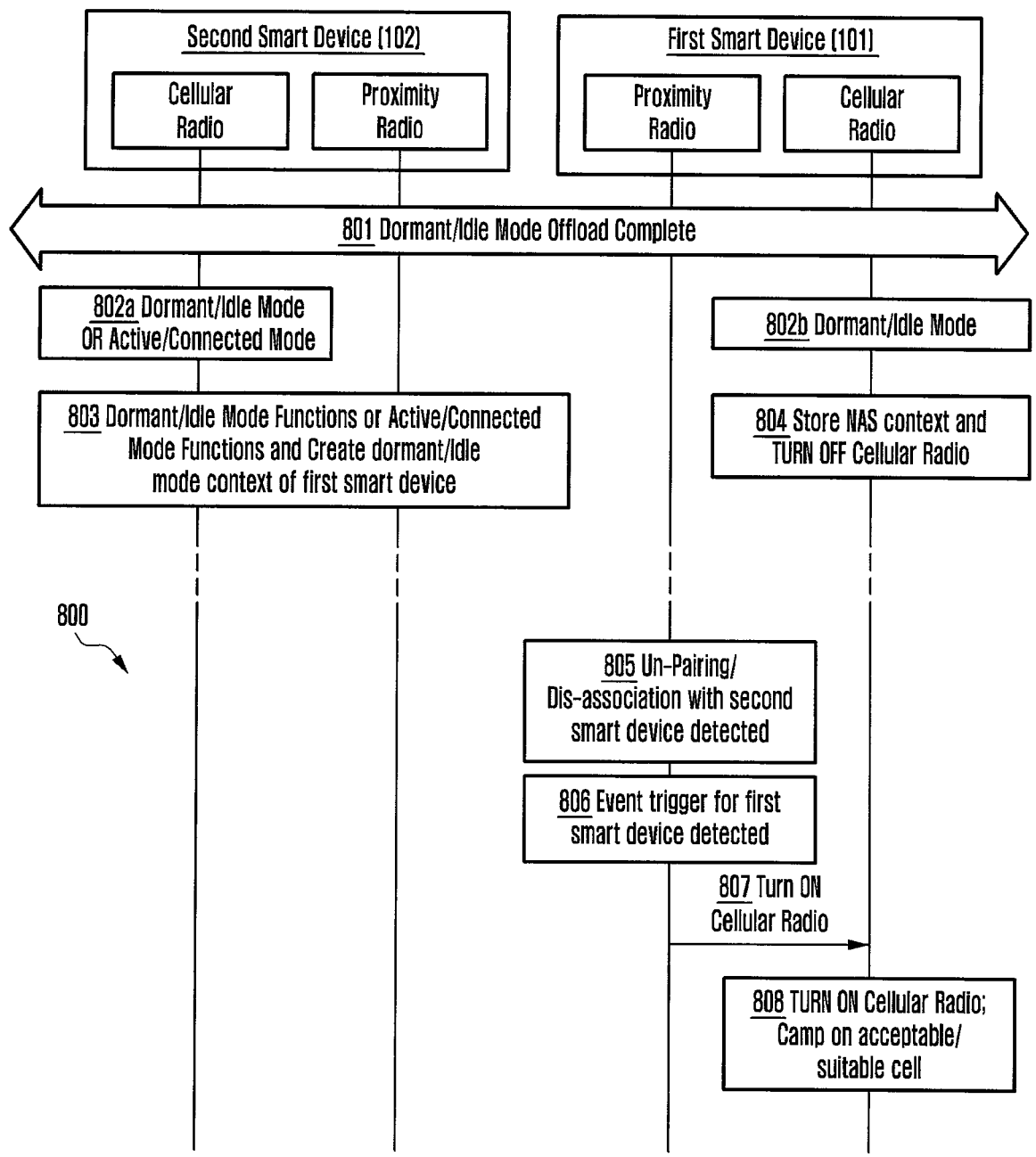
FIG. 8 illustrates actions taken on detecting an event trigger for first smart device according to one embodiment.

FIG. 8 illustrates a message sequence flow 800 depicting the actions taken by first smart device (101) on detecting an event trigger; wherein the event trigger concerns breaking (losing) the proximity radio connectivity between the first smart device (101) and the second smart device (102). At step 801, the procedure to offload idle mode operations to the second smart device (102) is successfully completed by first smart device (101) using any of the methods shown in FIG. 2, FIG. 3 or FIG. 4. The two smart devices are either paired based on the Bluetooth proximity radio interface or associated based on the WiFi proximity radio interface. During the course of time it may be possible that the proximity radio interface between the two smart devices is broken due to some reason like two device moving out of the coverage range of proximity radio interface. At step 805, if un-pairing or dis-association with proximity radio of the second smart device (102) is detected by proximity radio of the first smart device (101) then at step 806 an event trigger associated with proximity radio interface un-pairing and/or dis-association is generated. The trigger event leads to sending a cellular radio ON indication at step 807 from the proximity radio to the cellular radio through the radio layer interface of the first smart device (101). On the receiving the cellular radio ON indication at step 808 the first smart device (101) turns on the cellular radio and performs cell selection procedure according to 3GPP TS 36.304 to camp on a suitable or acceptable cell.

Figure 9A:
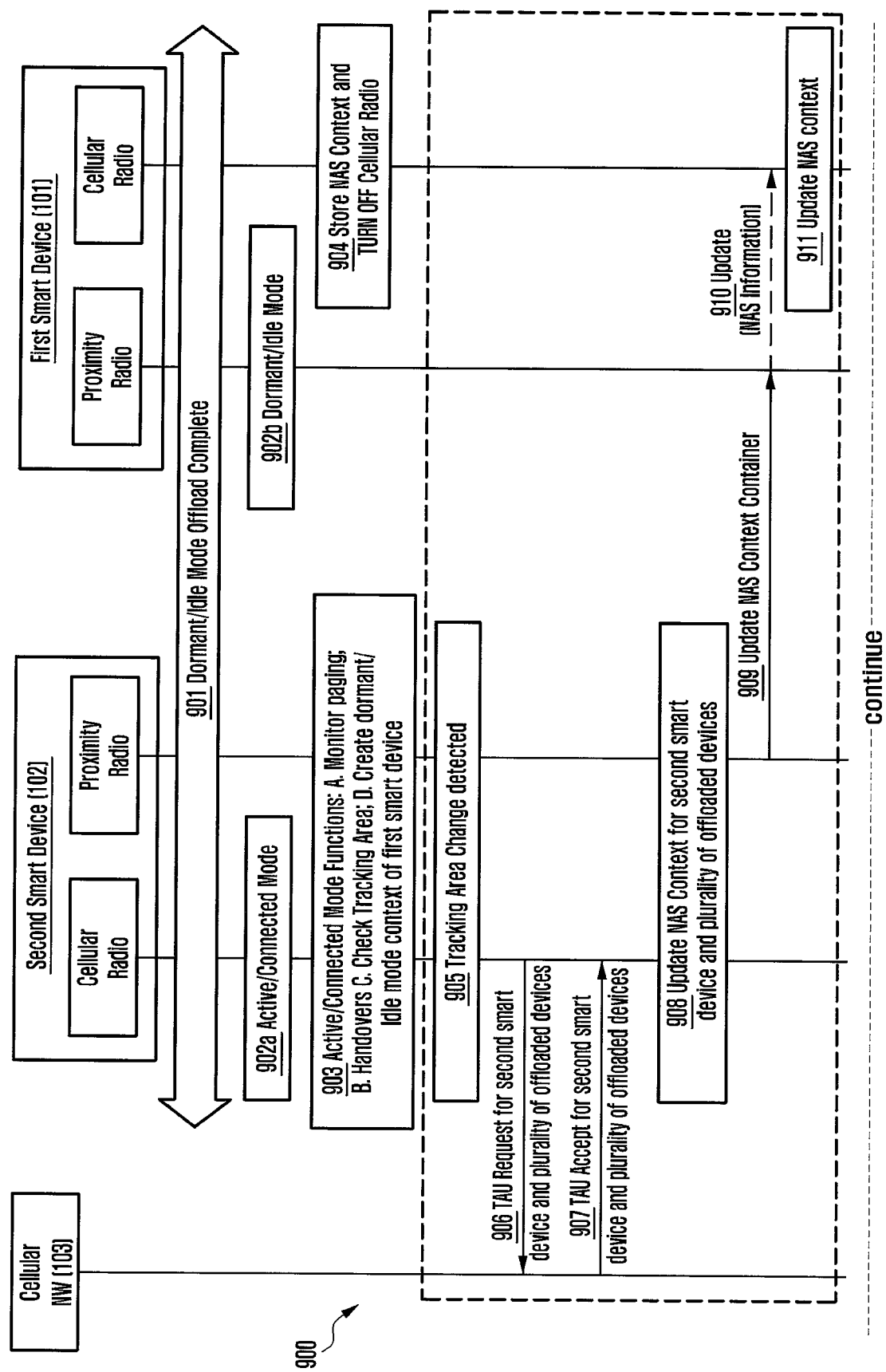
FIGS. 9A and 9B illustrate one or more idle mode functions performed on behalf of a plurality of first smart devices by a second smart device in active/connected mode according to one embodiment.
Figure 9B:
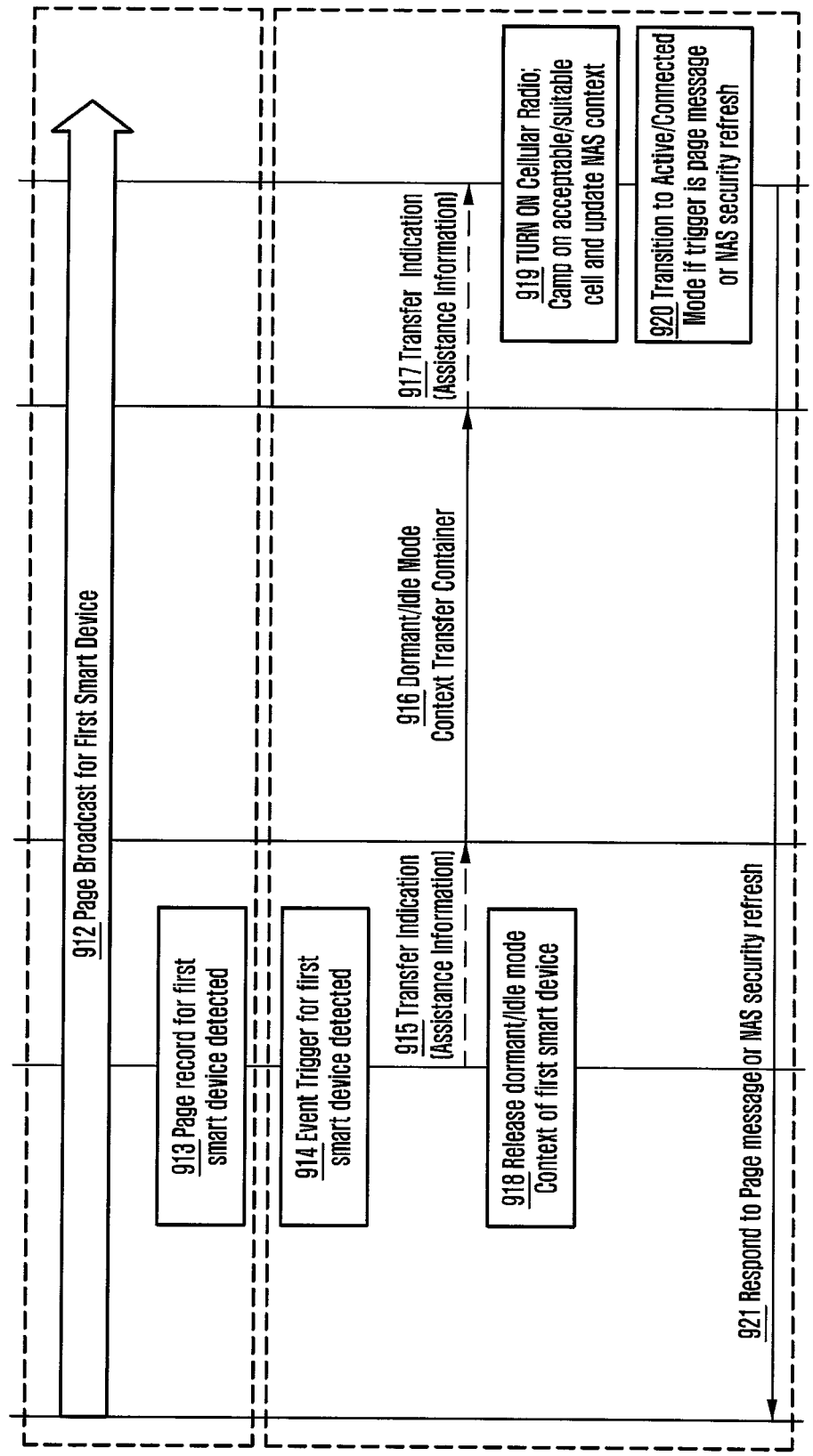

FIGS. 9A and 9B illustrate a message sequence flow 900 depicting one or more idle mode functions performed by a second smart device (102) on behalf of a first smart device (101) wherein the second smart device is in active/connected mode. The tracking area update procedure and paging monitoring procedure described in FIG. 5, FIG. 6 and FIG. 7 are performed by the second smart device (102) on behalf of the first smart device (101); wherein the second smart device is in dormant/idle mode. The cellular radio of second smart device (102) monitors paging regardless of the state of radio either dormant/idle mode or active/connected mode. When the second smart device (102) is in active/connected mode the paging message can indicate system information modification, notification for CMAS, notification for ETWS. However, if there is a mobile terminated call for the first smart device (101) then the paging message can include the page record for the first smart device (101). Therefore, even when the second smart device (102) is in active/connected mode the second smart device (102) may be able to monitor paging and detect paging record for mobile terminated call associated with the first smart device (101).

Tracking area update is triggered by NAS layer based on the TAC provided by AS layer to NAS layer based on conditions specified in 3GPP TS 24.301. The cellular radio of the second smart device (102) acquires system information from time to time depending on mobility and other conditions regardless of the state of cellular radio either dormant/idle mode or active/connected mode. Therefore, the offload of idle mode operation of the first smart device (101) is also feasible when the cellular radio of the second smart device (102) is in active/connected mode. At step 903, this is reflected as performing functions like monitoring paging in active/connected mode, performing handovers depending on mobility conditions and performing tracking area updates. Rest all the steps depicted in FIG. 9 are similar to steps shown in FIG. 5, FIG. 6 and FIG. 7. It is possible to that the steps shown in FIG. 9 are not performed in the same sequence as depicted and some of the steps may not be triggered if the event trigger for the first smart device is not detected. The various steps mentioned in FIG. 9 illustrates one or more idle mode functions performed by second smart device on behalf of first smart device wherein the second smart device is in active/connected mode; therefore either some of the steps can be combined, sequence of some steps can be modified or some steps can be omitted without deviating from the spirit of the illustrated procedure.

Figure 10B:
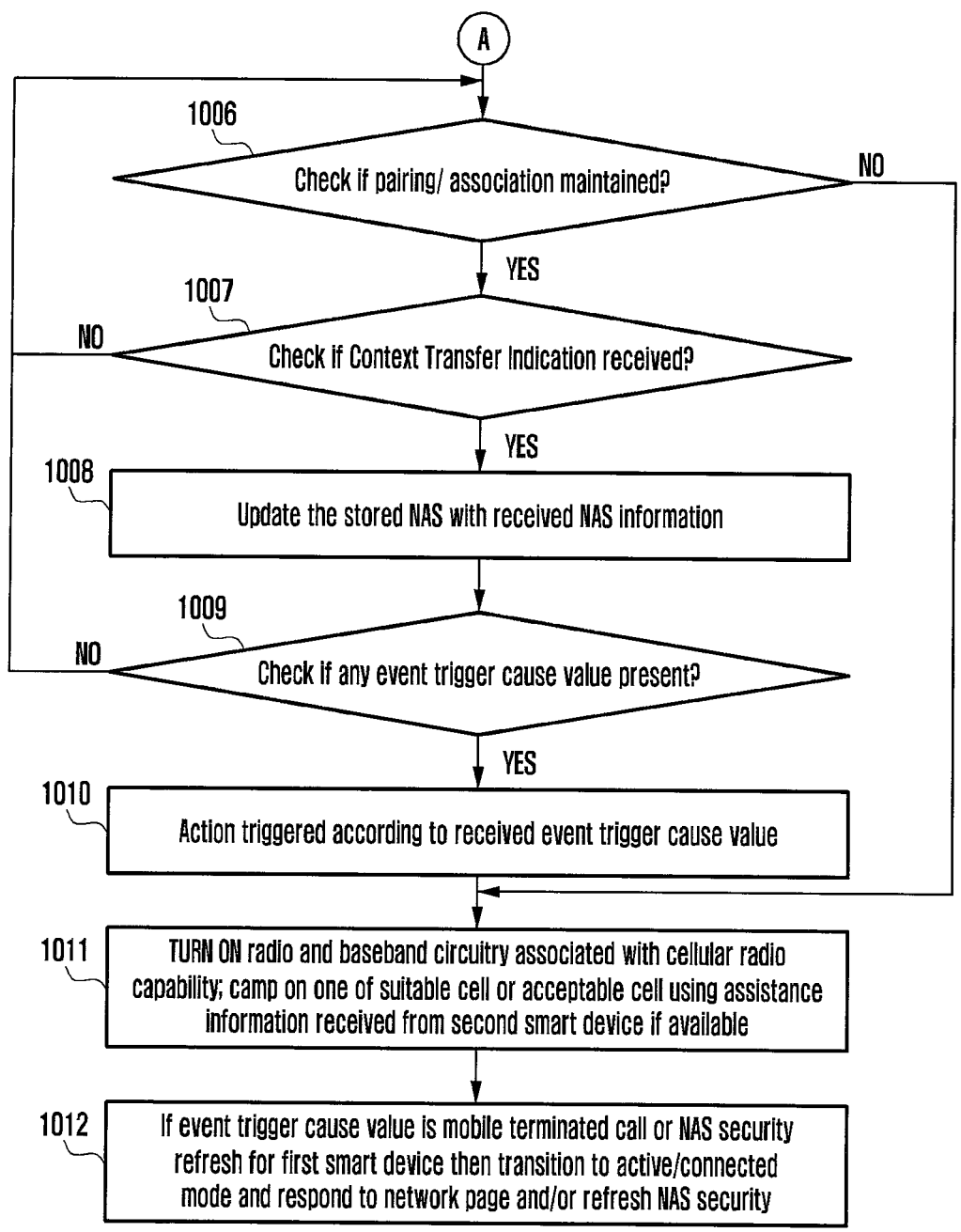

FIGS. 10A and 10B illustrate a flow chart sequence 1000 describing the detailed operation of a first smart device (101) for the offload of one or more idle mode functions associated with the cellular radio capability. At step 1001, the first smart device (101) pairs or associates using Bluetooth or WiFi proximity radio interface with a second smart device (102) having cellular radio capability. During the pairing or association the first smart device (101) performs mutual authentication with the second smart device (102) through proximity radio interface. The cellular radio state associated with the first smart device (101) is either dormant or idle mode from the cellular radio interface perspective. At step 1002, the first smart device obtains UE identity associated with second smart device and PLMN information associated with second smart device concerning the PLMN on which second smart device is registered. After verifying the received PLMN information a check is performed with the registered PLMN information associated with the first smart device at step 1003. If the registered PLMN information of both the devices is same then the first smart device sends offload request including assistance information to the second smart device at step 1004.

If network controlled idle mode offload is desired then before sending offload request to second smart device an offload indication is sent the cellular network including the UE identity associated with second smart device. Further message exchange for offload of idle mode is performed with the second smart device upon reception of permission from the cellular network. Alternatively, at step 1002, the first smart device may send offload request with PLMN information concerning the PLMN on which the first smart device is registered, offload interest indication, assistance information to the second smart device and in response receives offload accept message from the second smart device at step 1003. At step 1005, upon reception of Offload Accept Response from the second smart device over secured proximity interface; the first smart device store the NAS context associated with the cellular radio and TURN OFF radio and a baseband circuitry associated with cellular radio capability. Upon offload of idle mode functions to the second smart device; the first smart device periodically monitors if pairing and/or association is maintained with the second smart device over a proximity radio interface at step 1006.

In case, if pairing and/or association over proximity radio interface is detected to be broken between the first smart device and the second smart device then the flow control moves to step 1011 wherein the first smart device TURNS ON radio and baseband circuitry associated with cellular radio capability and camp on one of suitable cell or acceptable cell. If pairing and/or association over proximity radio interface is maintained between the first smart device and the second smart device then at step 1007 the first smart device checks for context transfer indication from the second smart device over the proximity radio interface. At step 1008, the first smart device updates the stored NAS context using new NAS information received from the second smart device if context transfer indication is received at step 1007 else the flow control moves to periodically check the pairing status at step 1006. At step 1009, the first smart device checks if any event trigger cause value is associated with context transfer indication. If event trigger cause value is received then subsequent action is triggered depending on the cause value of trigger event at step 1010. One of the actions at step 1011 is to TURN ON radio and baseband circuitry associated with cellular radio capability and camp on one of suitable cell or acceptable cell using assistance information received from second smart device if included along with event trigger cause value. In case, if event trigger cause value concerns mobile terminated call for the first smart device or event trigger cause value concerns NAS security refresh for the first smart device then the cellular radio transition to active/connected mode and respond to network page and/or refresh NAS security at step 1012. The flow sequence described in FIG. 10 illustrates detailed operation of the first smart device for the offload of one or more idle mode functions associated with the cellular radio capability; therefore either some of the steps can be combined, sequence of some steps can be modified or some steps can be omitted without deviating from the spirit of the illustrated operation.

Figure 11A:
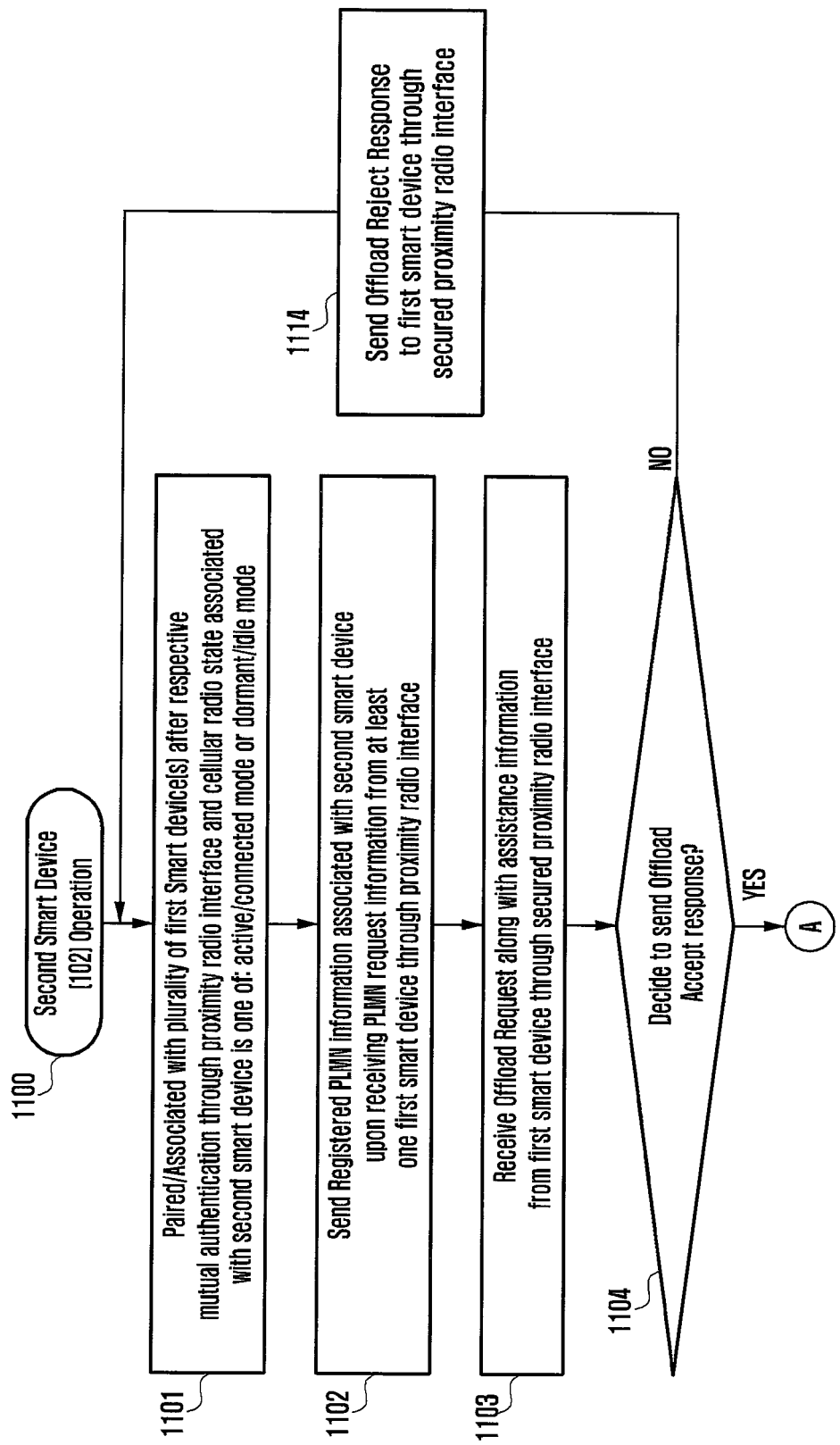
FIGS. 11A, 11B and 11C illustrate a flow chart UE operations for a second smart device when one or more idle mode functions are offloaded from a first smart device according to one embodiment.
Figure 11B:
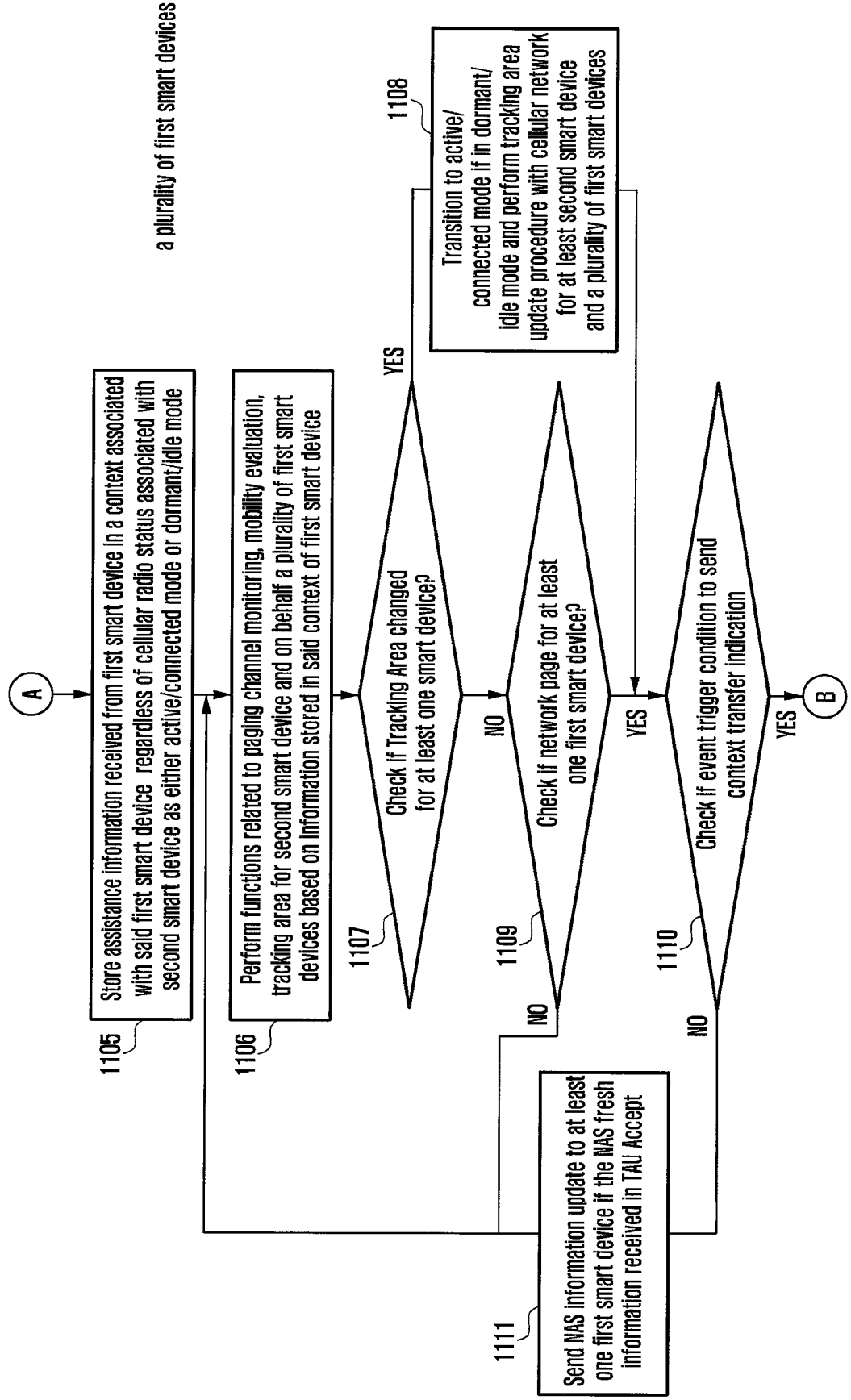
Figure 11C:
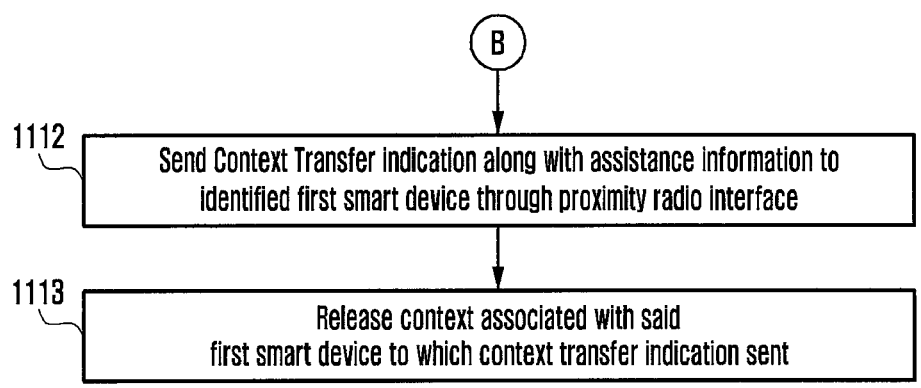

FIGS. 11A, 11B and 11C illustrate a flow chart sequence 1100 describing detailed operation of a second smart device when a cellular radio of a second smart device acts as proxy for one or more idle mode functions associated with the cellular radio capability of first smart device. At step 1101, the second smart device is paired/associated with at least one or plurality of first smart device(s) after respective mutual authentication through respective proximity radio interfaces. The cellular radio state associated with the second smart device is one of: active/connected mode or dormant/idle mode. At step 1102, the second smart device, send PLMN information associated with the second smart device concerning the PLMN on which the second smart device is registered upon receiving PLMN request from at least one or plurality of the first smart device(s) through respective proximity radio interfaces. The second smart device also sends UE identity associated with the second smart device to at least one or a plurality of the first smart devices through respective proximity radio interfaces. At step 1103, the second smart device receive Offload Request along with assistance information from the first smart device through secured proximity radio interface.

After receiving offload request the second smart device decide whether cellular radio of the second smart device can act as proxy for one or more idle mode functions associated with the cellular radio capability of the first smart device at step 1104. The decision may be positive depending on internal logic of the second smart device. There is sufficient battery power at disposal then the second smart device sends offload accept response to identified the first smart device on proximity radio interface at step 1104. If the decision is negative because battery power of the second smart device is weak then the secondary smart device may send offload reject response over proximity interface at step 1114. In case, if the second smart device sends offload accept response to identified first device at step 1104 then the second smart device store assistance information received from the first smart device in a context associated with the first smart device regardless of cellular radio state (i.e. either active/connected mode or dormant/idle mode) associated with the second smart device at step 1105. At step 1105, the second smart device perform functions related to paging channel monitoring, mobility evaluation, tracking area for the second smart device and on behalf of plurality of first smart device(s), D2D operation on behalf of a plurality of first smart devices based on information stored in the context of first smart device.

In case of any change in Tracking area is detected by NAS layer associated with the second smart device at step 1107 then a second smart transition to active/connected mode (if in dormant/idle mode) and perform tracking area update procedure with the cellular network for the second smart device and a plurality of first smart devices at step 1108. The flow control moves to step 1110 to check if any event trigger condition is met based on the TAU accept message received from the cellular network. In case the TAU accept message contains only fresh NAS information without any indication for NAS security refresh for the first smart device then at step 1111 the second smart device send NAS information update to plurality of the first smart devices on respective proximity interface. At step 1109, the second smart device monitor the paging channel for the second smart device and on behalf of a plurality of the first devices based on the assistance information provided by respective the first smart device(s). In case, if the second smart device detects page indication for the plurality of first smart devices then at step 1111 an event trigger is generated with appropriate cause value. Similarly, if the TAU accepts message includes an indication for NAS security refresh for the first smart device then at step 1111 and event trigger is generated with appropriate cause value. At step 1112 the second smart device sends Context Transfer indication along with event trigger cause value and assistance information to at least one first smart device on respective proximity radio interface. At step 1113, the second smart device also releases context associated with the first smart device to which context transfer indication is sent. The flow sequence described in FIG. 11 illustrates detailed operation of the second smart device when the cellular radio of the second smart device acts as proxy for one or more idle mode functions associated with the cellular radio capability of the first smart device; therefore either some of the steps can be combined, sequence of some steps can be modified or some steps can be omitted without deviating from the spirit of the illustrated operation.

Figure 12:
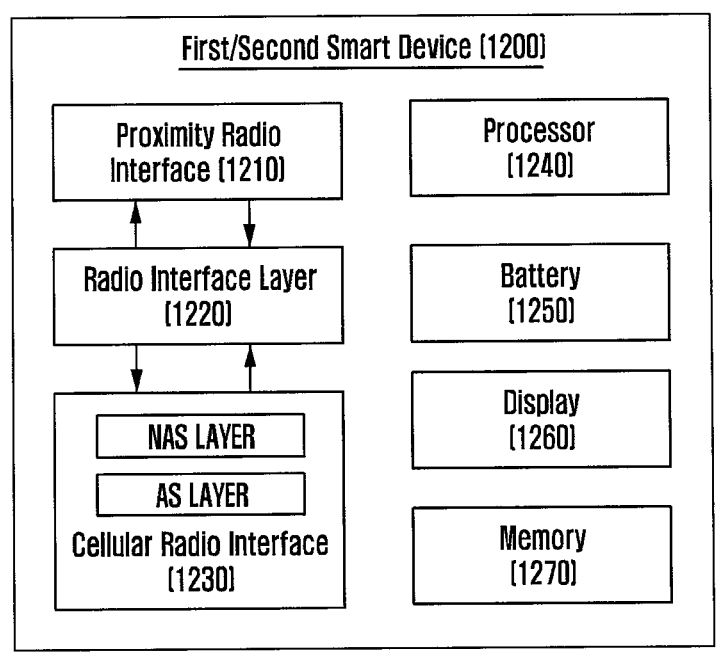
FIG. 12 illustrates a block diagram of a first smart device or a second smart device.

FIG. 12 illustrates a depiction of block diagram 1200 comprising the necessary hardware and software modules of a first smart device and a second smart device to realize the methods disclosed in the invention for offload of one or more idle mode functions. The primary blocks present in the first and second smart device includes a proximity radio interface 1210, a radio interface layer 1220, a cellular radio interface 1230, a processor 1240, a battery 1250, a memory 1260 and a display 1270.

The proximity radio interface 1210, which is a low power radio could be based on Bluetooth standard, WI FI standard or LTE based ProSe interface. The proximity radio interface 1210 contains all the necessary hardware and software components to perform baseband and radio operations such as pairing, discovery, association, data exchange on the proximity interface established with another proximity radio of same kind.

The radio interface layer 1220 acts as the coordinator between the proximity radio interface 1210 and cellular radio interface 1230 to handle the inter-radio messages. The information from the cellular radio interface 1230 is included in a container prepared by the radio interface layer and passed as application data to the proximity radio interface 1210. The container received from proximity radio interface 1210 is converted into appropriate access stratum information and non-access stratum information and passed on to the cellular radio interface 1230.

In an embodiment, the radio interface layer is configured to communicate inter-radio messages between the proximity radio interface and the cellular radio interface.

The cellular radio interface 1230 consist of all the necessary hardware and software components to perform baseband, radio and protocol processing related operations on the interface with the cellular network. These operations are divided between the access stratum layer and Non access stratum layer. The cellular radio interface could be based on LTE standard, UMTS standard, CDMA standard or any other cellular radio access technology. For example, the access stratum layer in the cellular radio interface 1230 in the smart device can be configured to receive the synchronization signal and system information from the cellular network to perform cell selection and cell re-selection. Further, the access stratum layer can be configured to perform random access procedure on the selected cell of the cellular network. Further, the cellular radio interface 1230 can be configured to transmit and receive data from the cellular network 103 according to physical layer waveform and coding specified for concerned radio access technology eg. IMT Advanced system specified by 3 GPP specification. Similarly the non-access stratum in the cellular radio interface 1230 can be configured to transmit and receive tracking area update request and accept messages and other NAS level messages to and from the cellular network according to protocol level messages specified for the concerned radio access technology.

The processor 1240 depicts a computing environment in the smart device (101/102) for implementing a method and system for offload of one or more idle mode functions according to the embodiments as disclosed herein. The computing environment of 1240 comprises at least one processing unit that is equipped with a control unit and an Arithmetic Logic Unit (ALU), a clock chip, plurality of networking devices, and a plurality Input output (I/O) devices. The processor 1240 is responsible for processing the instructions of the algorithm. The processing unit receives commands from the control unit in order to perform its processing. Further, any logical and arithmetic operations involved in the execution of the instructions are computed with the help of the ALU. The overall computing environment can be composed of multiple homogeneous or heterogeneous cores, multiple CPUs of different kinds, special media and other accelerators.

The processing unit is responsible for processing the instructions of the algorithm. The algorithm comprising of instructions and codes required for the implementation are stored in either the memory 1260 or the storage unit or both. At the time of execution, the instructions may be fetched from the corresponding memory 1260 or storage unit, and executed by the processing unit. The processing unit synchronizes the operations and executes the instructions based on the timing signals generated by the clock chip. The embodiments disclosed herein can be implemented through at least one software program running on at least one hardware device and performing management functions to control the elements. The methods shown in the FIGS. 10 and 11 include various units, blocks, modules, or steps described in relation with methods, processes, algorithms, or systems of the present invention, which can be implemented using any general purpose processor and any combination of programming language, application, and embedded processor.

The battery 1250 in the smart device (101/102) is responsible for powering the various modules as depicted in the block diagram 1200. The battery hosts the battery wherein the battery is similar to the battery seen in smartphones or other smart devices like smartwatch which requires regular charging from a power source. One of the main motivations of the method for offload of one or more idle mode functions according to the embodiments as disclosed herein is to save battery power consumption in a smart device wherein the battery standby time is low. By implementing the disclosed methods in the respective devices the standby time of battery of the first smart device can be significantly improved.

Further, the memory 1260 is also configured to store information related to smart device operation. The memory 1260 can be configured to store NAS information, assistance information exchanged between the devices, etc.

The display 1270 in the smart device (101/102) can be configured so that user can input information or information can output on the display for the user to understand some smart device operations when the smart device is performing offload operations. Most of the offload operations are transparent to the user and may not need user input nor output on the display. However, the mutual authentication between the proximity radios of the involved devices may require user input or output through the display.

In an embodiment at least one first smart device having cellular radio capability and proximity radio capability when in dormant/idle mode with respect to cellular interface offload one or more dormant/idle mode functions using a secured proximity radio interface to a second smart device having cellular radio capability and proximity radio capability; wherein the first smart device and the second smart device belong to the same registered PLMN. In an embodiment a mutual authentication procedure is performed between the first smart device and the second smart device through the proximity interface to develop mutual trust; before the first smart device start offload of one or more dormant/idle mode functions to the second smart device through secured proximity interface. In an embodiment, offload of one or more dormant/idle mode functions from the first smart device to the second smart device includes sending an offload indication to the cellular network containing identity associated with the second smart device; wherein the first smart device and the second smart device belong to the same registered PLMN.

In an embodiment, offload of one or more dormant/idle mode functions from the first smart device to the second smart device includes sending offload request message containing assistance information from the first smart device. In an embodiment, assistance information included in offload request message from the first smart device includes at least: identity information associated with the first smart device known to the network, UE capability information in terms of frequency bands supported by the first smart device, the parameters for paging cycle associated with first smart device, list of Message Authentication Code for NAS calculated using the NAS integrity key associated with the first smart device and other information like index of hashing function. In an embodiment, the first smart device turns OFF the first smart device's cellular radio capability upon offload of one or more dormant/idle mode functions using secured proximity radio interface to the second smart device having cellular radio capability and proximity radio capability until a time period wherein the first smart device and the second smart device are paired/associated with each other through the secured proximity interface. In an embodiment a dormant/idle mode offload operation associated with the cellular radio capability of the second smart device includes monitoring paging channel in dormant/idle mode for network page for the second smart device and on behalf of at least the first smart device having cellular radio capability; wherein the first smart device shares assistance information with the second smart device belonging to the same registered PLMN.

In an embodiment an active/connected mode operation associated with the cellular radio capability of a second smart device includes performing update of registration area for the second smart device and on behalf of at least a first smart device having cellular radio capability; wherein the second smart device when in dormant/idle mode receives tracking area code information from system information broadcast which when forwarded to NAS layer triggers tracking area update during idle mode mobility associated with the second smart device.

In an embodiment the UE identity information shared between the smart devices is at least one of the IMSI, S-TMSI, GUTI, hashed IMSI, IMSI mod 1024. In an embodiment the paging opportunity within the paging frame of the concerned smart device is shared as a subframe index corresponding to the number of subframes within the radio frame.

In an embodiment a first smart device just updates stored NAS context associated with radio access technology belonging to the cellular radio capability of the first smart device keeping cellular radio OFF upon receiving new NAS information from the second smart device. In an embodiment the first smart device turns ON its cellular radio capability and immediately camps on at least one of: a suitable cell and an acceptable cell associated with radio access technology belonging to the cellular radio capability of the first smart device upon receiving one of triggering event associated with the first smart device.

In an embodiment a second smart device releases the dormant/idle mode context associated with at least a first smart device upon detecting one of triggering event associated with the first smart device and notifying the triggering event to the first smart device through the secured proximity interface.

In an embodiment a triggering event associated with the first smart device includes sending a context transfer indication from the second smart device through secured proximity interface along with the event trigger cause value.

In an embodiment context transfer indication includes event trigger associated with one of: page for first smart device wherein the event trigger cause value indicates either mobile terminated call or system information modification or ETWS notification or CMAS notification and event trigger cause value for NAS security refresh for the first smart device.

In an embodiment a triggering event associated with the first smart device includes detecting by proximity radio of first smart device un-pairing/dis-association of the first smart device and the second smart device on the proximity interface and sending an indication to TURN ON the cellular radio of the first smart device.

In an embodiment the TAU request message sent by the second smart device may include a flag to indicate to the cellular network that the TAU request message also include TAU contents for a plurality of devices. In an embodiment the TAU contents for a plurality of devices includes the UE identity in the form of GUTI associated with the device, the MAC-i generated using the NAS integrity key associated with the device.

In an embodiment, assistance information included along with context transfer indication from a second smart device comprises one of: page record information associated with first smart device, update to the NAS information associated with a first smart device, and other information like system acquisition information related to a plurality of candidate cells. In an embodiment, system acquisition information related to the plurality of candidate cells is included in the context transfer indication from the second smart device to assist the first smart device to camp on at least one of: a suitable cell and an acceptable cell associated with radio access technology belonging to the cellular capability and UE capability of the first smart device.

In an embodiment operation of a second smart device having cellular radio capability includes monitoring paging channel in either active/connected mode or dormant/idle mode for network page for the second smart device and on behalf of at least one first smart device having cellular radio capability; wherein the first smart device shares assistance information related to page monitoring with the second smart device belonging to the same registered PLMN.

In an embodiment operation of a second smart device having cellular radio capability includes performing update of registration area with the cellular network for the second smart device and on behalf of at least one first smart device by including at least: a flag indicating the tracking area update request is on behalf of at least one first smart device, identity information associated with the first smart device and message authentication code for NAS (NAS-MAC) associated with the first smart device; wherein the first smart device shares assistance information with the second smart device belonging to the same registered PLMN. In an embodiment NAS layer of second smart device determines tracking area code has changed during either active/connected mode mobility or dormant/idle mode mobility associated with the second smart device to perform update of registration area with the cellular network for the second smart device and on behalf of at least one first smart device.

In an embodiment operation of a second smart device having cellular radio capability includes performing D2D operations such as transmit or receive ProSe direct communication in dormant/idle mode for the second smart device and on behalf of at least a first smart device having cellular radio capability; wherein the first smart device shares assistance information with the second smart device belonging to the same registered PLMN.

In an embodiment the second smart device can be a multi Subscriber Identity Module (SIM) device. In an embodiment the second smart device uses the protocol stack corresponding to SIM from a plurality of SIMs such that the PLMN selected by the second smart device is the same PLMN as first smart device. In an embodiment a multi SIM second smart device may be handling dormant/idle operations of one or more first smart devices on a first SIM and handling one or more first smart devices on a second SIM and so on.

In an embodiment operation of a second smart device having cellular radio capability includes monitoring paging channel in either active/connected mode or dormant/idle mode for network page for the second smart device and on behalf of at least one first smart device having cellular radio capability; wherein the first smart device shares assistance information related to page monitoring with the second smart device belonging to different registered PLMN.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a first device, the method comprising:
   entering an idle mode of a cellular radio interface;
   performing a proximity connection with a second device using a proximity radio interface;
   transmitting, to the second device, a first message to request offloading an idle mode function for the first device, in case that a registered public land mobile network (PLMN) of the second device is same as a registered PLMN of the first device;
   receiving, from the second device, a second message indicating that the second device accepts the request, as a response to the first message; and
   receiving, from the second device, a third message indicating that an event for the idle mode function for the first device occurs.

2. The method of claim 1, wherein the idle mode function of the first device comprises at least one of paging monitoring, cell re-selection, tracing area update, PLMN selection, device to device communication, or creating idle mode context of the first device.

3. The method of claim 1, wherein the receiving the third message comprises:
   receiving, from the second device, non-access stratum (NAS) context container using the proximity radio interface to update NAS information of the first device, in case that the second device detects the event to update the NAS information of the first device; and
   updating the NAS information of the first device.

4. The method of claim 1, wherein the receiving the third message comprises:
   receiving, from the second device, a context transfer container using the proximity radio interface, in case that the second device detects the event associated with the first device;
   updating NAS context based on information included in the context transfer container; and
   turning on the cellular radio interface;
   entering an active mode of the cellular radio interface; and
   transmitting a response message to a cellular network, in case that the event is associated with page record for the first device.

5. A method of a second device, the method comprising:
   performing a proximity connection with a first device using a proximity radio interface after the first device enters an idle mode of a cellular radio interface;
   receiving, from the first device, a first message to request offloading an idle mode function for the first device to the second device, transmitted in case that a registered public land mobile network (PLMN) of the second device is same as a registered PLMN of the first device;
   transmitting, to the first device, a second message indicating that the second device accepts the request, as a response to the first message received from the first device; and
   transmitting, to the first device, a third message indicating that an event for the idle mode function for the first device occurs.

6. The method of claim 5, wherein the idle mode function of the first device comprises at least one of paging monitoring, cell re-selection, tracing area update, PLMN selection, device to device communication, or creating idle mode context of the first device.

7. The method of claim 5, wherein the transmitting the third message comprises:
   transmitting, to a cellular network, a tracking area update (TAU) request message for the second device and the first device, in case that tracking area change is detected;
   receiving a TAU accept message in response to the TAU request message, wherein the TAU accept message includes non-access stratum (NAS) information for the second device and the first device;
   updating an NAS context for the second device;
   creating the NAS context associated with the first device; and
   transmitting, to the first device, a NAS context container using the proximity radio interface to update the NAS information of the first device.

8. The method of claim 5, wherein the transmitting the third message comprises:
   transmitting, to the first device, a context transfer container using the proximity radio interface, in case that the second device detects the event associated with the first device.

9. A first device comprising:
   a transceiver; and
   a processor configured to:
      enter an idle mode of a cellular radio interface;
      perform a proximity connection with a second device using a proximity radio interface;
      control the transceiver to transmit, to the second device, a first message to request offloading an idle mode function for the first device, in case that a registered public land mobile network (PLMN) of the second device is same as a registered PLMN of the first device;
      control the transceiver to receive, from the second device, a second message indicating that the second device accepts the request, in response to the first message; and
      control the transceiver to receive, from the second device, a third message indicating that an event for the idle mode function for the first device occurs.

10. The first device of claim 9, wherein the idle mode function of the first device comprises at least one of paging monitoring, cell re-selection, tracing area update, PLMN selection, device to device communication, or creating idle mode context of the first device.

11. The first device of claim 9, wherein the processor is configured to:
    control the transceiver to receive, from the second device, non-access stratum (NAS) context container using the proximity radio interface to update NAS information of the first device, in case that the second device detects the event to update the NAS information of the first device; and
    update the NAS information of the first device.

12. The first device of claim 9, wherein the processor is configured to:
    control the transceiver to receive, from the second device, a context transfer container using the proximity radio interface, in case that the second device detects the event associated with the first device;
update NAS context based on information included in the context transfer container; and
turn on the cellular radio interface;
enter an active mode of the cellular radio interface; and
control the transceiver to transmit a response message to a cellular network, in case that the event is associated with page record for the first device.

13. A second device comprising:
a transceiver; and
a processor configured to:
  perform a proximity connection with a first device using a proximity radio interface after the first device enters an idle mode of a cellular radio interface;
  control the transceiver to receive, from the first device, a first message to request offloading an idle mode function for the first device to the second device, transmitted in case that a registered public land mobile network (PLMN) of the second device is same as a registered PLMN of the first device;
  control the transceiver to transmit, to the first device, a second message indicating that the second device accepts the request, in response to the first message received from the first device; and
  control the transceiver to transmit, to the first device, a third message indicating that an event for the idle mode function for the first device occurs.

14. The second device of claim 13, wherein the idle mode function of the first device comprises at least one of paging monitoring, cell re-selection, tracing area update, PLMN selection, device to device communication, or creating idle mode context of the first device.

15. The second device of claim 13, wherein the processor is configured to:
  control the transceiver to transmit, to a cellular network, a tracking area update (TAU) request message for the second device and the first device, in case that tracking area change is detected;
  control the transceiver to receive a TAU accept message in response to the TAU request message, wherein the TAU accept message includes non-access stratum (NAS) information for the second device and the first device;
  update an NAS context for the second device;
  create the NAS context associated with the first device; and
  control the transceiver to transmit, to the first device, a NAS context container using the proximity radio interface to update the NAS information of the first device.

16. The second device of claim 13, wherein the processor is configured to:
  control the transceiver to transmit, to the first device, a context transfer container using the proximity radio interface, in case that the second device detects the event associated with the first device.

* * * * *